(12) United States Patent
Blevins et al.

(10) Patent No.: US 6,615,090 B1
(45) Date of Patent: *Sep. 2, 2003

(54) DIAGNOSTICS IN A PROCESS CONTROL SYSTEM WHICH USES MULTI-VARIABLE CONTROL TECHNIQUES

(75) Inventors: Terrence L. Blevins, Round Rock, TX (US); Mark J. Nixon, Round Rock, TX (US); Wilhelm K. Wojsznis, Round Rock, TX (US)

(73) Assignee: Fisher-Rosemont Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,446

(22) Filed: Feb. 7, 2000

Related U.S. Application Data

(63) Continuation-in-part of application No. 09/256,585, filed on Feb. 22, 1999, now Pat. No. 6,298,454.

(51) Int. Cl.[7] .............................................. G05G 11/01
(52) U.S. Cl. ............................. 700/26; 700/19; 700/20; 700/23; 700/27; 700/49; 700/53; 714/37; 714/46; 714/47; 702/183; 702/184; 702/185
(58) Field of Search ........................ 700/18–23, 86–88, 700/26, 27, 28, 48–53; 714/37, 38, 46, 47, 25; 702/183, 184, 185

(56) References Cited

U.S. PATENT DOCUMENTS

| 3,096,434 A | 7/1963 | King ........................... 235/151 |
| 3,404,264 A | 10/1968 | Kugler ........................ 235/194 |
| 3,701,280 A | 10/1972 | Stroman ....................... 73/194 |
| RE29,383 E | 9/1977 | Gallatin et al. ............... 137/14 |
| 4,058,975 A | 11/1977 | Gilbert et al. ............. 60/39.28 |
| 4,099,413 A | 7/1978 | Ohte et al. .................... 73/359 |
| 4,337,516 A | 6/1982 | Murphy et al. ............. 364/551 |
| 4,358,822 A | 11/1982 | S´´nchez ...................... 364/151 |
| 4,517,468 A | 5/1985 | Kemper et al. ............... 290/52 |
| 4,530,234 A | 7/1985 | Cullick et al. ................. 73/53 |

(List continued on next page.)

FOREIGN PATENT DOCUMENTS

| DE | 35 40204 C1 | 9/1986 |
| DE | 40 08 560 A1 | 9/1990 |
| DE | 44 33 593 A1 | 6/1995 |

(List continued on next page.)

OTHER PUBLICATIONS

US 2002/0010562 A1, Schleiss et al., Jan. 24, 2002, Diagnostics in a Process Control System.*
Great Britain Search Report for GB 0003975.0 (corresponding to U.S. Ser. No. 09/499,446) dated Jun. 16, 2000.

(List continued on next page.)

*Primary Examiner*—Ramesh Patel
(74) *Attorney, Agent, or Firm*—Marshall, Gerstein & Borun

(57) ABSTRACT

A diagnostic tool automatically collects and stores data indicative of a variability parameter, a mode parameter, a status parameter and a limit parameter for a multi-variable function block associated with one or more devices or loops within a process control system, processes the collected data to determine which devices, loops or function blocks have problems that result in reduced performance of the process control system, displays a list of detected problems to an operator and then suggests the use of other, more specific diagnostic tools to further pinpoint or correct the problems. When the diagnostic tool recommends and executes a data intensive application as the further diagnostic tool, it automatically configures a controller of the process control network to collect the data needed for such a tool.

20 Claims, 7 Drawing Sheets

U.S. PATENT DOCUMENTS

| | | | |
|---|---|---|---|
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,663,703 A | 5/1987 | Axelby et al. | 364/149 |
| 4,707,796 A | 11/1987 | Calabro et al. | 364/552 |
| 4,777,585 A | 10/1988 | Kokawa et al. | 364/164 |
| 4,819,233 A | 4/1989 | Delucia et al. | 371/19 |
| 4,831,564 A | 5/1989 | Suga | 364/551.01 |
| 4,843,557 A | 6/1989 | Ina et al. | 364/431.77 |
| 4,873,655 A | 10/1989 | Kondraske | 364/553 |
| 4,907,167 A | 3/1990 | Sheirik | 364/500 |
| 4,924,418 A | 5/1990 | Bachman et al. | 364/550 |
| 4,934,196 A | 6/1990 | Romano | 73/861.38 |
| 4,964,125 A | 10/1990 | Kim | 371/15.1 |
| 4,992,965 A | 2/1991 | Hö lter et al. | 364/551.01 |
| 5,005,142 A | 4/1991 | Lipchak et al. | 364/550 |
| 5,022,028 A | 6/1991 | Edmonds et al. | 371/25.1 |
| 5,043,862 A | 8/1991 | Takahashi et al. | 364/162 |
| 5,053,815 A | 10/1991 | Wendell | 355/208 |
| 5,081,598 A | 1/1992 | Bellows et al. | 364/550 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,142,612 A | 8/1992 | Skeirik | 395/11 |
| 5,148,378 A | 9/1992 | Shibayama et al. | 364/571.07 |
| 5,159,660 A | 10/1992 | Lu et al. | 395/22 |
| 5,167,009 A | 11/1992 | Skeirik | 395/27 |
| 5,175,678 A | 12/1992 | Frerichs et al. | 364/148 |
| 5,191,521 A | 3/1993 | Brosilow | 364/100 |
| 5,193,143 A | 3/1993 | Kaemmerer et al. | 395/51 |
| 5,197,114 A | 3/1993 | Sheirik | 395/22 |
| 5,197,328 A | 3/1993 | Fitzgerald | 73/168 |
| 5,200,028 A | 4/1993 | Tatsumi | 156/656 |
| 5,200,958 A | 4/1993 | Hamilton et al. | 371/16.4 |
| 5,212,765 A | 5/1993 | Skeirik | 395/11 |
| 5,214,582 A | 5/1993 | Gray | 364/424.03 |
| 5,224,203 A | 6/1993 | Skeirik | 395/22 |
| 5,228,780 A | 7/1993 | Sheperd et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,301,101 A | 4/1994 | MacArthur et al. | 364/156 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,311,562 A | 5/1994 | Palusamy et al. | 376/215 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,367,612 A | 11/1994 | Bozich et al. | 395/22 |
| 5,384,699 A | 1/1995 | Levy et al. | 364/413.13 |
| 5,386,373 A | 1/1995 | Keeler et al. | 364/577 |
| 5,390,287 A | 2/1995 | Obata | 395/67 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,414,645 A | 5/1995 | Hirano | 364/551.01 |
| 5,419,197 A | 5/1995 | Ogi et al. | 73/659 |
| 5,424,942 A | 6/1995 | Dong et al. | 364/164 |
| 5,428,559 A | 6/1995 | Kano | 364/578 |
| 5,430,642 A | 7/1995 | Nakajima et al. | 364/148 |
| 5,440,478 A | 8/1995 | Fisher et al. | 364/188 |
| 5,467,355 A | 11/1995 | Umeda et al. | 364/571.04 |
| 5,469,735 A | 11/1995 | Watanabe | 73/118.1 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,500,941 A | 3/1996 | Gil | 395/183.14 |
| 5,511,004 A | 4/1996 | Dubost et al. | 364/551.01 |
| 5,517,424 A | 5/1996 | Marcelle et al. | 364/494 |
| 5,539,638 A | 7/1996 | Keeler et al. | 364/424.03 |
| 5,548,528 A | 8/1996 | Keeler et al. | 364/497 |
| 5,561,599 A | 10/1996 | Lu | 364/164 |
| 5,566,065 A | 10/1996 | Hansen et al. | 364/164 |
| 5,566,275 A | 10/1996 | Kano | 395/81 |
| 5,570,282 A | 10/1996 | Hansen et al. | 364/148 |
| 5,570,300 A | 10/1996 | Henry et al. | 364/551.01 |
| 5,572,420 A | 11/1996 | Lu | 364/153 |
| 5,586,066 A | 12/1996 | White et al. | 364/576 |
| 5,586,221 A | 12/1996 | Isik et al. | 395/22 |
| 5,598,521 A | 1/1997 | Kilgore et al. | 395/326 |
| 5,600,148 A | 2/1997 | Cole et al. | 250/495.1 |
| 5,625,574 A | 4/1997 | Griffiths et al. | 364/550 |
| 5,640,491 A | 6/1997 | Bhat et al. | 395/22 |
| 5,659,667 A | 8/1997 | Buescher et al. | 395/23 |
| 5,671,335 A | 9/1997 | Davis et al. | 395/23 |
| 5,671,351 A | 9/1997 | Wild et al. | 395/183.14 |
| 5,675,504 A | 10/1997 | Sérodes et al. | 364/496 |
| 5,682,317 A | 10/1997 | Keeler et al. | 364/431.03 |
| 5,704,011 A | 12/1997 | Hansen et al. | 395/22 |
| 5,740,033 A | 4/1998 | Wassick et al. | 364/149 |
| 5,781,878 A | 7/1998 | Mizoguchi et al. | 701/109 |
| 5,801,942 A * | 9/1998 | Nixon et al. | 700/17 |
| 5,825,646 A | 10/1998 | Keeler et al. | 364/164 |
| 5,838,561 A | 11/1998 | Owen | 364/152 |
| 5,841,652 A | 11/1998 | Sanchez | 364/164 |
| 5,848,365 A | 12/1998 | Coverdill | 701/35 |
| 5,850,339 A | 12/1998 | Giles | 364/148 |
| 5,893,055 A | 4/1999 | Chen | 702/189 |
| 5,995,916 A | 11/1999 | Nixon et al. | 702/182 |
| 6,014,612 A | 1/2000 | Larson et al. | 702/183 |
| 6,098,116 A * | 8/2000 | Nixon et al. | 709/220 |
| 6,298,454 B1 * | 10/2001 | Schleiss et al. | 714/37 |
| 6,330,525 B1 * | 12/2001 | Hays et al. | 376/245 |

FOREIGN PATENT DOCUMENTS

| | | |
|---|---|---|
| DE | 195 02 499 A1 | 8/1996 |
| EP | 0 122 622 | 10/1984 |
| EP | 6 400 1914 | 6/1989 |
| EP | 0 362 386 | 4/1990 |
| EP | 0 377 736 | 7/1990 |
| EP | 0 413 814 A1 | 2/1991 |
| EP | 0 487 419 A2 | 5/1992 |
| EP | 0 594 227 A1 | 4/1994 |
| EP | 0 624 2192 | 9/1994 |
| EP | 0 624 847 A1 | 11/1994 |
| EP | 0 644 470 A2 | 3/1995 |
| EP | 0 723 4988 | 9/1995 |
| EP | 0 827 096 A2 | 3/1998 |
| FR | 2 334 827 | 12/1976 |
| GB | 928704 | 6/1993 |
| JP | 58-129316 | 8/1983 |

| | | |
|---|---|---|
| JP | 59-116811 | 7/1984 |
| JP | 59-211196 | 11/1984 |
| JP | 59-211896 | 11/1984 |
| JP | 60-507 | 1/1985 |
| JP | 60-76619 | 5/1985 |
| JP | 60-131495 | 7/1985 |
| JP | 62-30915 | 2/1987 |
| JP | 64-1914 | 1/1989 |
| JP | 64-72699 | 3/1989 |
| JP | 2-5105 | 1/1990 |
| JP | 5-122768 | 5/1993 |
| JP | 7-63586 | 3/1995 |
| JP | 8-54923 | 2/1996 |
| JP | 8-136386 | 5/1996 |
| JP | 8-166309 | 6/1996 |
| WO | WO 94/25933 | 11/1994 |
| WO | WO 97/2115 | 6/1997 |
| WO | WO 98/39718 | 11/1998 |

OTHER PUBLICATIONS

Great Britain Search Report for GB 0004093.1 (corresponding to U.S. Ser. No. 09/499,445) dated Jun. 16, 2000.

Alguindigue et al., "Using Artificial Neural Networks to Identify Nuclear Power Plant States," *The University of Tennessee Department of Nuclear Engineering*, pp. 1–4.

Berkan et al., "Fuzzy Logic and Artificial Neural Networks for Nuclear Power Plant Applications," *Proceedings of the American Power Conference*, 5 pages.

Blalock et al., "A Decade of Progress in High Temperature Johnson Noise Thermometry," *American Institute of Physics*, pp. 1219–1223, 1982.

Blalock et al., "Johnson Noise Power Thermometer and Its Application in Process Temperature Measurement," *American Institute of Physics*, pp. 1249–1259, 1982.

Blalock et al., "Survey Applications, and Prospects of Johnson Noise Thermometry," *University of Tennessee Electrical Engineering Department*, 13 pages, Mar. 31, 1981.

Boland, "Smart Field Devices Provide New Process Data, Increase System Flexibility," *I & CS*, pp. 45–51, Nov. 1994.

Borkowski et al., "A New Method of Johnson Noise Thermometry," *Rev. Sci. Instrum.*, vol. 45, No. 2, pp. 151–162, Feb., 1974.

Boynton, "Sensor and Device for Predictive and Proactive Maintenance," *Electric Power Research Institute—Fossil Plant Maintenance Conference*, pp. 50–1 to 50–6, Jul. 29, 1996.

Brixy et al., "Noise Thermometry for Industrial and Metrological Applications at KFA Jülich," *The 7th International Symposium on Temperature Its Measurement and Control in Science and Industry*, 4 pages, Apr. 28, 1992.

Cleaveland, "Field–Based Architecture is Based on Open Systems, Improves Plant Performance," *I CS*, pp. 73–74, Aug. 1996.

deGroot et al., "Development of a Resistance Thermometer for Use Up to 1600 ° C," *Cal Lab*, Jul.–Aug. 1996.

DeltaV™, "DeltaV–Site Map," 1 page, Nov. 1, 1999.

de Groot et al., "Development of a Resistance Thermometer for Use Up to 1600<C," *Cal Lab*, Jul.–Aug. 1996.

DeltaV™, "DeltaV Home Page," page 1 of 2, Nov. 1, 1999.

DeltaV™, "DeltaV–Backgrounder," page 1 of 2, Nov. 1, 1999.

DeltaV™, "DeltaV–FAQs," 3 pages, Nov. 1, 1999.

DeltaV™, "DeltaV Version 4.2," 3 pages, Nov. 1, 1999.

Desborough et al., "Performance Assessment Measures for Univariate Feedback Control," *The Canadian Journal of Chemical Engineering*, vol. 70, pp. 1186–1197, Dec. 1992.

Desborough et al., "Performance Assessment Measures for Univariate Feedforward/Feedback Control," *The Canadian Journal of Chemical Engineering*, vol. 71, pp. 605–616, Aug. 1993.

Electric Power Institute, "in Situ Calibration of Nuclear Plant Platinum Resistance Thermometers Using Johnson Noise Methods," EPRI Project 1440–1 Final Report, Jun. 1983.

Eryürek et al., "Neural Networks for Sensor Validation and Plantwide Monitoring," *Nuclear Europe Worldscan* vol. XII, No. 1–2, 4 pages, Feb. 1992.

Eryürek et al., "Parallel, Fault–Tolerant Control and Diagnostics System for Feedwater Regulation in PWRS," *Proceedings of the American Power Conference*, 6 pages.

Eryürek et al., "Sensor Validation for Power Plants Using Adaptive Backpropagation Neural Network," *IEEE Transactions on Nuclear Science*, vol. 31 No. 2, pp. 1040–1047, Apr. 1990.

Eryürek et al., "Software–Based Fault–Tolerance Control Design for Improved Power Plant Operation IEEE/IFAC Joint Symposium on Computer–Aided Control System Design," pp. 585–590, 1994.

Fisher Rosemount Systems, Inc., "DeltaV Book Online," 1996.

Foxboro Company, "Foxboro Company, Pharmaceutical Industry," 10 pages, Sep. 8, 1998.

Frank et al., "Fuzzy Logic and Neural Network Applications to Fault Diagnosis," *International Journal of Approximate Reasoning*, vol. 16, pp. 67–88, 1997.

Harris, T., "Assessment of Control Loop Performance," *The Canadian Journal of Chemical Engineering*, vol. 67, pp. 856–861, Oct. 1989.

Harris et al., "Performance Assessment of Multivariable Feedback Controllers," *Automatica*, vol. 32, No. 11, pp. 1505–1518, 1996.

Hashemian et al., "IN–SITU Response Time Testing of Thermocouples," pp. 587–593, 1989.

Hashiguchi, "Measurement of the Temperature Fluctuation in a Resistor Generating 1/f Fluctuation," *362 Japanese Journal of Applied Physics*, vol. 22, pp. L284–L286, May 1983.

Henry, "A Fault–Tolerant Interface for Self–Validating Sensors," *IEEE Colloquium on Condition Monitoring and Fault Tolerance*, 3 pages, Nov. 1990.

Henry, "'Intelligent' Behaviour for Self–Validating Sensors," *Advances in Measurement*, pp. 1–7.

Henry, "Keynote Paper: Hardware Compilation—A New Technique for Rapid Prototyping of Digital Systems—Applied to Sensor Validation," *Control Engineering Practice*, vol. 3, No. 7, pp. 907–924, 1995.

Henry, "Signal Processing, Data Handling and Communications: The Case for Measurement Validation," 9 pages.

Henry et al. "A Standard Interface for Self–Validating Sensors," *Report No. OUEL 1884/91, Department of Engineering Science*, 17 pages, 1991.

Henry et al., "The Implications of Digital Communications on Sensor Validation," *Report No. OUEL 1912/92, Department of Engineering Science*, 7 pages, 1992.

Henry et al., "Programmable Hardware Architectures for Sensor Validation," *Control Engineering Practice*, vol. 4, No. 10, pp. 1339–1354, 1996.

Huang, et al., "Good, Bad or Optimal? Performance Assessment of Multivariable Processes," *Automatica*, vol. 33, No. 66, pp. 1175–1183, 1997.

Kerlin et al., "Smart Temperature Measurement in the '90s," C & I, 3 pages.

Kisilevskii et al., "Check of Semiconductor Thermal Resistance Elements By the Method of Noise Thermometry," *Measurement Techniques*, vol. 25, No. 3, pp. 244–246, Mar. 1982.

Love et al., "A Knowledge–Based Approach for Detection and Diagnosis of Out–of–Control Events in Manufacturing Processes," *IEEE*, pp. 736–741, 1989.

Lowry et al., "The Performance of Control Charts for Monitoring Process Variation," *Commun. Statist.—Simula.*, 24(2), pp. 409–437, 1995.

Massiha et al., "Detection of Hot Spots in Thin Metal Thin Films Using an Ultra Sensitive Dual Channel Noise Measurement System," *IEEE Proceedings vol. 3, Energy and Information Technologies in the Southeast* pp. 1309–1314, Apr. 9, 1989.

Matrikon Consulting Inc., "Welcome to Matrikon," 1 page, Sep. 1, 1998.

Matrikon Consulting Inc., "Welcome to Matrikon Consulting Inc.: Process Information and Expert Systems," 1 page, Sep. 1, 1998.

Matrikon Consulting Inc., "Welcome to Matrikon Consulting Inc.: Control and Automation," 1 page, Sep. 1, 1998.

Matrikon ProcessDoc, "Matrikon Application Products—ProcessDoc," 2 pages, Sep. 1, 1998.

Matrikon ProcessDoc, "Process Doc—Alarm Management," 1 page, Sep. 1, 1998.

Matrikon ProcessDoc, "ProcessDoc—Audit Your Control Loops," 1 page, Sep. 1.

Matrikon ProcessDoc, "ProcessDoc—Monitor Your Process," 1 page, Sep. 1, 1998.

Matrikon ProcessDoc, "ProcessDoc—Non–Intrusive Operation," 2 pages, Sep. 1, 1998.

Matrikon ProcessDoc, "prodoc.pdf at www.matrikon.com," p. 1 of 2, Sep. 1, 1998.

Matrikon Systems, Inc., "Welcome to Matrikon Systems," 1 page, Sep. 1, 1998.

Newland, "Wavelet Analysis of Vibration, Part 1: Theory[1]," *Journal of Vibration and Acoustics*, vol. 116, pp. 409–416, Oct. 1994.

Newland, "Wavelet Analysis of Vibration, Part 2: Wavelet Maps," *Journal of Vibration and Acoustics, vol. 116*, pp. 417–425, Oct. 1994.

Oakes et al., "Johnson Noise Thermometer for High–Radiation and High–Temperature Environments," *Manuscript for the Fifth Symposium on Space Nuclear Power Systems*, 14 pages, Jan. 1988.

Orrison, G., "Taking Full Advantage of Smart Transmitter Technology Now," *699 Control Engineering*, pp. 59–61, Jan. 1995.

Qin, "Control Performance Monitoring—A Review and Assessment," *NSF/NIST Workshop*, pp. 173–186, Mar. 6–8, 1998.

Rhinehart, R., "A CUSUM Type On–Line Filter," *Department of Chemical Engineering, MS3121*, pp. 169–176, 1992.

Roberts et al., "Application of Johnson Noise Thermometry to Space Nuclear Reactors," *6th Symposium on Space Nuclear Power Systems*, 10 pages, Jan. 1989.

Roberts et al., "Tuned–Circuit Johnson Noise Thermometry," *7th Symposium on Space Nuclear Power Systems*, 7 pages, Jan. 1990.

Shephard et al., "Development of a Long–Life High–Reliability Remotely Operated Johnson Noise Thermometer," *Advances in Instruments and Control*, pp. 77–84, Oct. 1991.

Shepard et al., "Tuned–Circuit Dual–Mode Johnson Noise Thermometers," *7th ITS*, 3 pages, Apr. 1992.

Shunta, "Achieving World Class Manufacturing Through Process Control," Prentice Hall PTR, pp. vii–202, 1995.

Taya et al., "Detecting Blockage in Process Connections of Differential Pressure Transmitters," *SICE '95*, pp. 1605–1608, 1995.

Upadhyaya et al., "An Integrated Architecture for Signal Validation in Power Plants," *Third IEEE International Symposium on Intelligent Control*, pp. 1–6, Aug. 1988.

Upadhyaya et al., "Application of Neural Computing Paradigms for Signal Validation," *Department of Nuclear Engineering*, pp. 1–18.

Upadhyaya et al., "Application of Neural Networks for Sensor Validation and Plant Monitoring," *Nuclear Technology*, vol. 97, pp. 169–176, Feb. 1992.

Upadhyaya et al., "Automated Generation of Nonlinear System Characterization for Sensor Failure Detection," *Nuclear Engineering Department*, pp. 269–274, 1989.

Upadhyaya et al., "Development and Application of Neural Network Algorithms for Process Diagnostics," *Proceedings of the 29th Conference on Decision and Control*, pp. 3277–3282, 1990.

Upadhyaya et al., "Integration of Multiple Signal Validation Modules for Sensor Monitoring," *Manuscript for the 8th Symposium on Space Nuclear Power Systems*, pp. 1–6, Jul. 1990.

Upadhyaya et al., "Neural Networks for Sensor Validation and Plant Monitoring," *International Fast Reactor Safety Meeting*, pp. 1–10, Aug. 1990.

VanDoren, "Software Review: Analysis Software Answers Performance Questions," *Control Engineering*, 2 pages, Apr. 1998.

Weisman, "On–Line Statistical Process Control for a Glass Tank Ingredient Scale," *IFAC Real Time Programming*, pp. 29–38, 1980.

Great Britain Search Report for GB 0001440.7 (corresponding to U.S. Ser. No. 09/256,585) dated May 11, 2000.

Search Report under Section 17 issued in GB 0001440.7 application by the United Kingdom Patent Office on Oct. 24, 2002.

* cited by examiner

DIAGNOSTICS IN A PROCESS CONTROL SYSTEM WHICH USES MULTI-VARIABLE CONTROL TECHNIQUES

RELATED APPLICATION

This is a continuation-in-part of U.S. patent application Ser. No. 09/256,585, filed Feb. 22, 1999 now U.S. Pat. No. 6,298,454, entitled "Diagnostics in a Process Control System."

FIELD OF THE INVENTION

The present invention relates generally to process control systems and, more particularly, to the automatic detection of problems existing within function blocks, devices and loops which use multi-variable control techniques within a process control system.

DESCRIPTION OF THE RELATED ART

Process control systems, like those used in chemical, petroleum or other processes, typically include a centralized process controller communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, Profibus, AS-Interface and CAN protocols, have been developed to enable smart field devices made by different manufacturers to be used together within the same process control network.

Moreover, there has been a move within the process control industry to decentralize process control functions. For example, the all-digital, two-wire bus protocol promulgated by the Fieldbus Foundation, known as the FOUNDATION™ Fieldbus (hereinafter "Fieldbus") protocol uses function blocks located in different field devices to perform control operations previously performed within a centralized controller. In particular, each Fieldbus, field device is capable of including, and executing one or more function blocks, each of which receives inputs from and/or provides outputs to other function blocks (either within the same device or within different devices), and performs some process control operation, such as measuring or detecting a process parameter, controlling a device or performing a control operation, such as implementing a proportional-derivative-integral (PID) control routine. The different function blocks within a process control system are configured to communicate with each other (e.g., over a bus) to form one or more process control loops, the individual operations of which are spread throughout the process and are, thus, decentralized.

With the advent of smart field devices, it is more important than ever to be able to quickly diagnose and correct problems that occur within a process control system, as the failure to detect and correct poorly performing loops and devices leads to sub-optimal performance of the process, which can be costly in terms of both the quality and the quantity of the product being produced. Many smart devices currently include self-diagnostic and/or calibration routines that can be used to detect and correct problems within the device. For example, the FieldVue and ValveLink devices made by Fisher Controls International Inc. have diagnostic capabilities that can be used to detect certain problems within those devices and also have calibration procedures that can be used to correct problems, once detected. However, an operator must suspect that a problem exists with the device before he or she is likely to use such diagnostic or calibration-features of the devices. There are also other process control tools, such as auto-tuners that can be used to correct poorly tuned loops within a process control network. Again, however, it is necessary to identify a poorly operating loop before such auto-tuners can be used effectively. Similarly, there are other, more complex, diagnostic tools, such as expert systems, correlation analysis tools, spectrum analysis tools, neural networks, etc. which use process data collected for a device or a loop to detect problems therein. Unfortunately, these tools are data intensive and it is practically impossible to collect and store all of the high speed data required to implement such tools on each process control device or loop of a process control system in any kind of systematic manner. Thus, again, it is necessary to identify a problem loop or a device before being able to effectively use these tools.

Each device or function block within a smart process control network typically detects major errors that occur therein and sends a signal, such as an alarm signal or an event signal, to notify a controller or a host device that an error or some other problem has occurred. However, the occurrence of these alarms or events does not necessarily indicate a long-term problem with the device or loop that must be corrected, because these alarms or events may be generated in response to (or be caused by) other factors that were not a result of a poorly performing device or loop. Thus, the fact that a device within a process control system or a function block within a control loop generates an alarm or event does not necessarily mean that the device or loop has a problem that needs to be corrected. On the other hand, many devices can have problems without the problem rising to the level of severity to be detected as an alarm or an event.

To initially detect problems within the process control system, a process control operator or technician generally has to perform a manual review of data generated within a process control system (such as alarms and events, as well as other device and loop data) to identify which devices or loops are operating sub-optimally or are improperly tuned. This manual review requires the operator to have a great deal of expertise in detecting problems based on raw data and, even with such expertise, the task can be time-consuming at best and overwhelming at worst. This is especially true for multi-variable control blocks, such as neural network or other multi-input control blocks, which are very complex in nature and in which problems are even more difficult to detect. As one example, an instrumentation department of even a medium-sized operating plant may include between 3,000 and 6,000 field devices such as valves and transmitters. In such an environment, the instrument technician or control engineer responsible for a process area simply does not have the time to review the operation of all the field device instrumentation and control loops to detect which loops or devices may not be operating properly or may have some problem therein. In fact, because of limited manpower, the only devices usually scheduled for maintenance are those that have degraded to the point that they dramatically impact the quantity or quality of the product being produced. As a result, other devices or loops which need to be retuned or which otherwise have a problem therein that could be corrected using the tools at hand are not corrected, leading to the overall degraded performance of the process control system.

The patent application entitled "Diagnostics in a Process Control System," which was filed on Feb. 22, 1999 as patent application Ser. No. 09/256,585, discloses a diagnostic tool which automatically collects measurements of certain parameters of blocks within a process control system and which then detects problems or poorly performing loops or blocks within this system based on the collected data to thereby ease an operator's task of detecting faulty or poorly performing devices and loops. However, more recently, multi-variable control blocks or techniques are being used to provide control in a process control system. Generally speaking, multi-variable control blocks, which may, for example, implement model predictive control, neural network, adaptive tuning, multi-variable fuzzy logic, RTO optimizing, or blending techniques, simultaneously produce one or more process control outputs using two or more process inputs provided to the control block. Similar to single-loop control strategies, it is desirable to provide a diagnostic tool that can detect and possibly correct poorly performing or problematic loops which use such multi-variable control blocks.

SUMMARY OF THE INVENTION

A diagnostic tool for use in a process control system that utilizes multi-variable control techniques or blocks automatically collects and stores data pertaining to one or more of the different multi-variable blocks (devices or loops) within the system, processes that data to determine which of these blocks, devices, or loops have problems that may result in the reduced performance of the process control system, and then may suggest the use of other, more specific diagnostic tools to further analyze and correct the problem. The diagnostic tool may detect problems or identify poorly performing devices or loops using variability indications, mode indications, status indications or limit indications associated with each of the input or output variables used by or created by the multi-variable function blocks or devices within a process control system. The variability indication is preferably determined or partially determined by each function block within the process control system to provide a statistical measurement of the deviation of a parameter associated with the device or function block from a set point or other value associated with the device or function block. The mode indication identifies the mode in which a function block or device is operating, e.g., a normal mode or a non-normal mode, to indicate if the device or function block is operating in its designed mode. The status indication identifies the quality of a signal associated with the function block or device at any given time. The limit indication may identify if a function block signal is limited in nature.

The diagnostic tool may determine which function blocks, devices or loops have problems associated therewith based on the instantaneous values or on a compilation of the historical values of one or more of the variability indication, the mode indication, the status indication, the limit indication or other data associated with each function block or device. Thereafter, the diagnostic tool may report detected problems to an operator via a display screen and/or may generate written reports (such as printed reports) or electronic reports sent, for example, over the Internet (e.g., through E-mail) to concerned persons.

Upon detecting problems within one or more process control devices or loops, the diagnostic tool may suggest the proper tool(s) to be used to further pinpoint the problem and/or to, correct the detected problem. If requested to do so, the diagnostic tool executes these further tools on a host workstation to enable an operator to perform further diagnostic functions. In cases where the diagnostic tool requires the use of further data intensive tools to diagnose or pinpoint a specific problem (such as an expert system or a correlation analysis tool), the diagnostic tool may automatically configure the host system to collect the data needed to run that further tool.

In this manner, the diagnostic tool identifies the function blocks, devices, loops, etc. which need attention without requiring an operator to review massive amounts of data pertaining to numerous devices and loops within a process control system. This saves time on the part of the operator and does not require the operator to have a great deal of expertise in detecting problem loops and devices, especially with respect to multi-variable function blocks or control strategies which are very complex. Also, upon detecting a problem, the diagnostic tool may recommend the use of further tools to pinpoint and/or correct the problem, which enables the operator to correct problems without having to guess as to which tool is the most appropriate in any given situation. Besides saving time, this function reduces the burden on the operator and helps to assure that the proper diagnostic tools are used in each circumstance.

DESCRIPTION OF THE PREFERRED EMBODIMENTS

Figure 1:
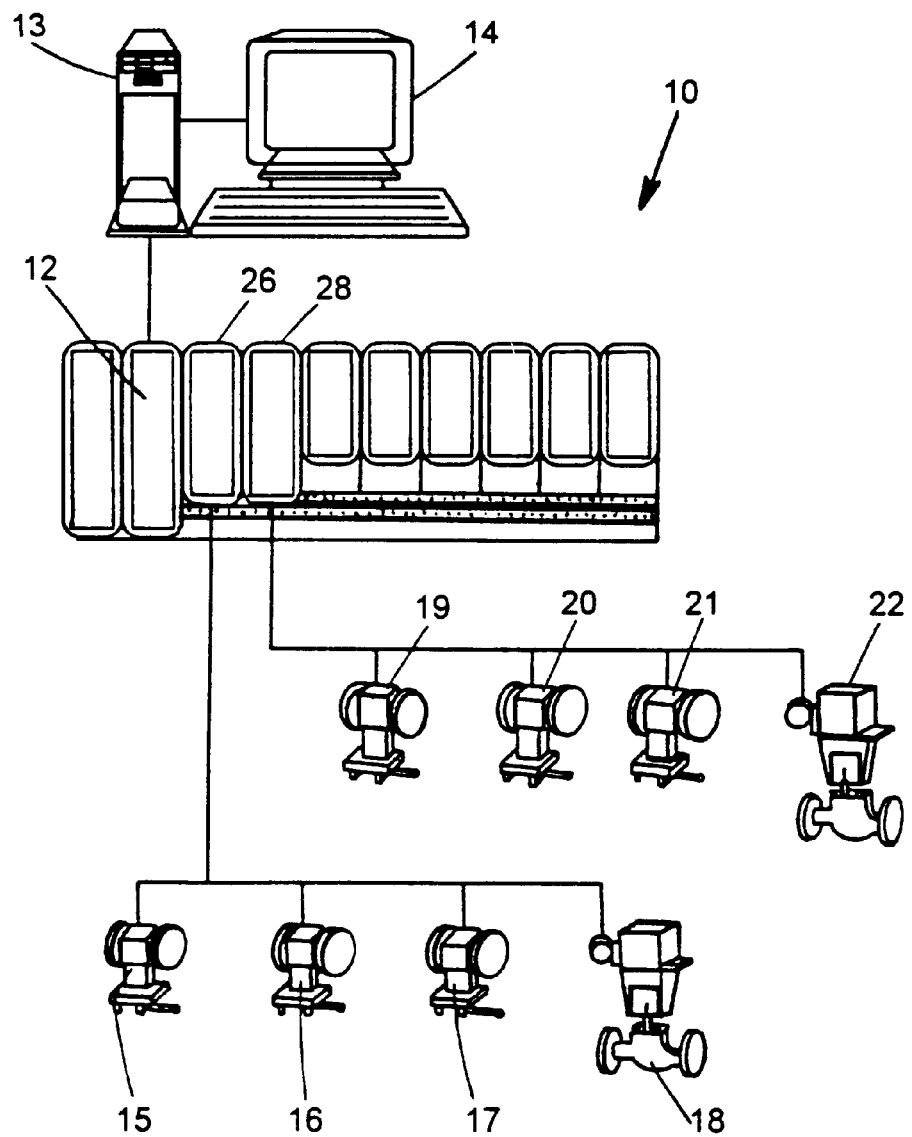
FIG. 1 is a block diagram of a process control system in which a multi-variable function block diagnostic tool can be used.

Referring now to FIG. 1, a process control system 10 includes a process controller 12 connected to a host workstation or computer 13 (which may be any type of personal computer or workstation) having a display screen 14 and connected to field devices 15–22 via input/output (I/O) cards 26 and 28. The controller 12, which may be by way of example, the DeltaV™ controller sold by Fisher-Rosemount Systems, Inc., is communicatively connected to the host computer 13 via, for example, an ethernet connection and is communicatively connected to the field devices 15–22 using any desired, hardware and software associated with, for example, standard 4–20 ma devices and/or any smart communication protocol such as the Fieldbus protocol. The controller 12 implements or oversees a process control routine stored therein or otherwise associated therewith and communicates with the devices 15–22 and the host computer 13 to control a process in any desired manner.

The field devices 15–22 may be any types of devices, such as sensors, valves, transmitters, positioners, etc. while the I/O cards 26 and 28 may be any types of I/O devices conforming to any desired communication or controller protocol. In the embodiment illustrated in FIG. 1, the field devices 15–18 are standard 4–20 ma devices that communicate over analog lines to the I/O card 26 while the field devices 19–22 are smart devices, such as Fieldbus field devices, that communicate over a digital bus to the I/O card 28 using Fieldbus protocol communications. Generally speaking, the Fieldbus protocol is an all-digital, serial, two-way communication protocol that provides a standardized physical interface to a two-wire loop, or bus that interconnects field devices. The Fieldbus protocol provides, in effect, a local area network for field devices within a process, which enables these field devices, to perform process control functions (using Fieldbus function blocks) at locations distributed throughout a process facility and to communicate with one another before and after the performance of these process control functions to implement an overall control strategy. It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein. Of course, the field devices 15–22 could conform to any other desired standard(s) or protocols besides the Fieldbus protocol, including any standards or protocols developed in the future.

The controller 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, model predictive control, neural network, etc. control, or an output function which controls the operation of some device, such as a valve, to perform some physical function within the process control system 10. Of course hybrid and other types of function blocks exist. Function blocks may be stored in and executed by the controller 12, which is typically the case when these function blocks are used for, or are associated with standard 4–20 ma devices and some types of smart field devices, or may be stored in and implemented by the field devices themselves, which is the case with Fieldbus devices. While the description of the control system is provided herein using function block control strategy, the control strategy could also be implemented or designed using other conventions, such as sequential function charts, ladder logic or any other programming strategy implemented in any desired programming language or paradigm.

Figure 2:
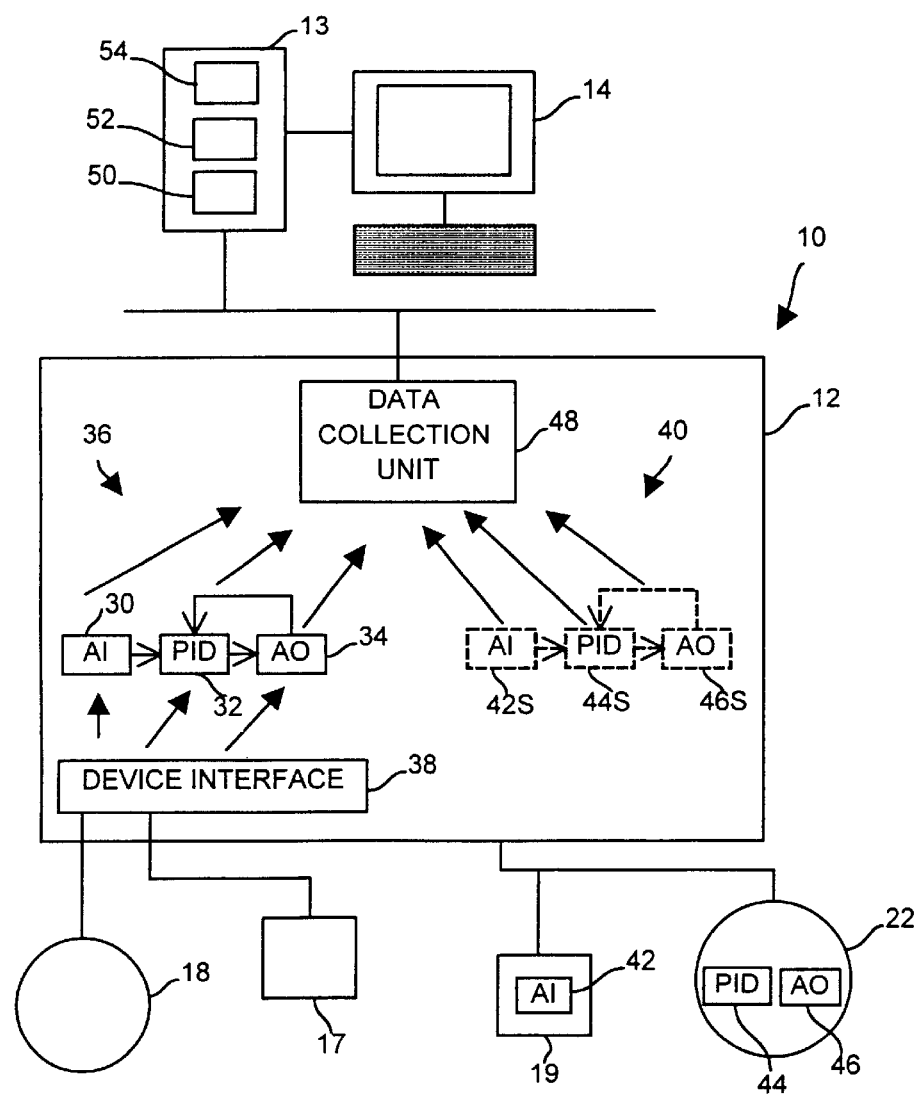
FIG. 2 is a block diagram of a process control system of FIG. 1 illustrating the configuration of two process control loops run in conjunction with a diagnostic tool.

The left side of the controller 12 illustrated in FIG. 2 includes a schematic representation of interconnected function blocks 30, 32, and 34 making up an example single-input/single-output process control loop 36 configured to use the standard 4–20 ma devices 17 and 18. Because the function blocks 30, 32 and 34 are related to the operation of 4–20 ma devices, these function blocks are stored in and executed by the controller 12. In a preferred embodiment, in which a DeltaV controller is used, the function blocks 30, 32 and 34 are configured to be similar to, that is, to use the same or similar protocol, as Fieldbus function blocks. However, this convention is not necessary as other function block or programming configurations could be used instead. As illustrated in FIG. 2, the function block 30 is an analog input (AI) function block that provides a measurement made by, for example, the transmitter (sensor) device 17, to the function block 32. The function block 32 is a PID function block that performs calculations using any desired PID strategy and delivers a control signal via a link to the function block 34, which is preferably an analog output (AO) function block. The AO function block 34 communicates with, for example, the valve device 18 to cause the valve 18 to open or close according to the control signal from the PID function block 32. The AO function block 34 also delivers a feedback signal, which may be indicative of the position of the valve 18, to the PID function block 32, which uses this feedback signal to generate the control signal. The controller 12 includes a device interface 38 (which may be implemented in the controller 12 or in the I/O device 26 of FIG. 1) to communicate with the devices 15–18 to obtain measurements made thereby and to deliver control signals thereto according to the control loop 36 or other control loops. The device interface 38 systematically receives signals from the devices 15–18 and delivers these signals to the proper function block within the controller 12 associated with the sending device. Likewise, the device interface 38 systematically delivers control signals from function blocks within the controller 12 to the proper field device 15–18.

The right side of the controller 12 in FIG. 2 illustrates a sample single-input/single-output control loop 40 implemented using Fieldbus function blocks 42, 44 and 46 located down within the Fieldbus field devices 19 and 22. In this instance, the actual function blocks 42, 44, and 46 are stored in and executed by the field devices 19 and 22 and communicate their associated attributes to shadow function blocks 42S, 44S and 46S (illustrated as dotted-line boxes) within the controller 12. The shadow function blocks 42S, 44S and 46S are set up according to the function block configuration used by the controller 12 but mirror the state of the actual function blocks 42, 44 and 46, respectively, so that it appears to the controller 12 that the actual functions associated with the function blocks 42, 44 and 46 are being executed by the controller 12. The use of shadow function blocks within the controller 12 enable the controller 12 to implement a control strategy using function blocks stored in and executed within the controller 12 as well as within field devices. Of course, the controller 12 can implement control loops having both standard function blocks (like function blocks 30, 32 and 34) and shadow function blocks therein. For example, the PID shadow function block 44S, associated with the actual function block 44 in the valve positioner 22, could be linked to the AI function block 30 and the AO function block 34 to form a process control loop. The creation and implementation of shadow function blocks is not the subject of the present invention and is described in more detail in U.S. patent application Ser. No. 09/151,084 entitled "A Shadow Function Block Interface for Use in a Process Control Network," filed Sep. 10, 1998, which is assigned to the assignee of the present invention and the disclosure which is hereby expressly incorporated by reference herein.

Figure 9:
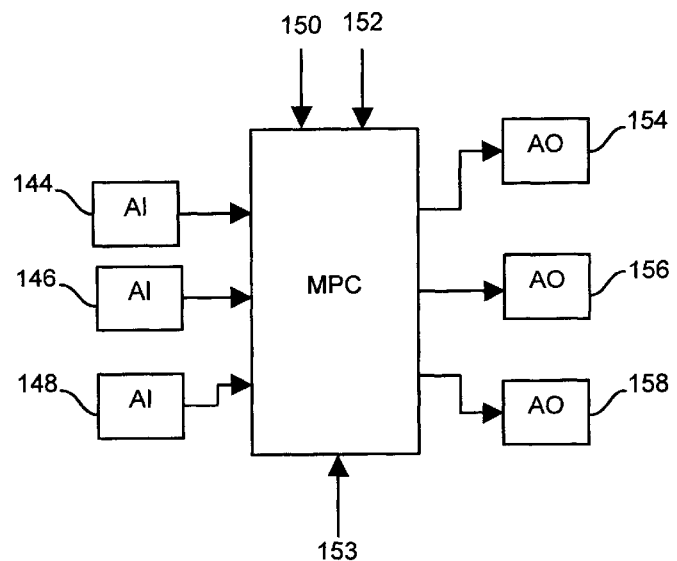
FIG. 9 is a block diagram of a process control loop using a multi-variable control block.

The controller 12 and/or the field devices connected to the controller 12 may additionally or alternatively implement one or more multi-input/multiple-output control loops using multi-variable control blocks or programs, such as blocks which implement control or other operations based on model predictive control (MPC) logic, neural network control logic, adaptive tuning logic, fuzzy logic control logic, optimization logic, blending logic, etc. FIG. 9 illustrates a multi-variable control loop 140 which uses an MPC control block 142 to implement a three-by-three MPC control technique. As illustrated in FIG. 9, three AI blocks 144, 146 and 148 provide process inputs to the MPC block 142 which uses these inputs, as well as constrained inputs, 150 and 152 and a set-point 153 delivered from, for example, an operator, to perform MPC control in any known or desired manner. The MPC block 142 produces three output signals which are provided to AO blocks 154, 156 and 158 which, in turn, control parameters within the process, such as the opening and closing of valves, etc. Of course, one or more of the input signals to the MPC block 142 may be feedback or back calibration signals provided by one of the AO blocks 154, 156 and 158.

The operation of MPC is known and, as such, will not be described in detail herein. However, as is known generally, each MPC block as well as other types of multi-variable blocks typically has three kinds of inputs including controlled parameter inputs which are the process variables or parameters that are to be maintained at a set point (or within a set range), constrained inputs which are the process variables that are constrained to a particular limit or range based on, for example, physical limitations associated with the process and which the control block must not force to be outside of the constrained range or limit, and process disturbance parameter inputs, which are other process variables, such as process inputs that, when altered, are known to cause changes to the controlled parameters. An MPC block uses the process disturbance parameter inputs to foresee changes to the controlled parameters (i.e., the controlled process outputs) and to limit the effects of these changes before they occur. Other inputs may also be provided to the MPC block 142, such as feedback from a device or other process element being controlled which enables the MPC control block 142 to provide more effective control of these elements. Similarly, the outputs of the MPC block 142 may be connected to control any desired process variable or other process input including control loop inputs, device control inputs, etc.

Of course, the MPC block 142 could be replaced with any other multi-variable block. Likewise, the multi-variable loop 140 may be implemented entirely within the controller 12, entirely within one or more smart field devices or partially within the controller 12 and one or more smart field devices, in a manner similar to that described above with respect to single-input/single-output control loops. Moreover, while the MPC control block 142 is illustrated as a three-by-three block, it or any other multi-variable block used could have any desired number of two or more inputs and/or any desired number of outputs. As will be understood, the number of input and outputs to a multi-variable block can be the same or different.

For the purposes of this invention, a control block can be any part or portion of a process control system including, for example, a routine, a block or a module stored on any computer readable medium. Moreover, control blocks or routines, which may be modules or any part of a control procedure such as a subroutine, parts of a subroutine (such as lines of code), etc. may be implemented in any desired software format, such as using ladder logic, sequential function charts, function block diagrams, or any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firm ware programming or design tools. Thus, the controller 12 may be configured to implement a control strategy or a control routine using single-input/single-output or multiple-input/ multiple-output control blocks in any desired manner.

Figure 10:
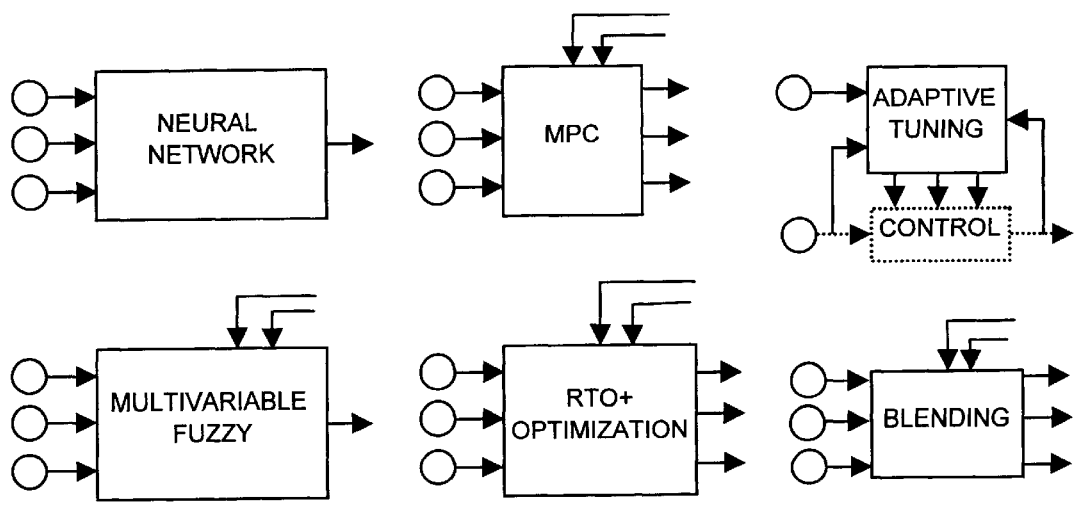
FIG. 10 is a set of diagrams illustrating example multi-variable function blocks.

The MPC block 142 of FIG. 9 has been provided as an example multi-variable block that could be used in a process control system. Of course other types of multi-variable blocks could be used as well. For example, FIG. 10 illustrates other multi-variable blocks that accept multiple inputs to produce one or more outputs. In particular, as illustrated in FIG. 10, multi-variable blocks could include a neural network wherein multiple inputs are used to produce a single output, adaptive tuning wherein multiple inputs are used by a tuning block to produce one or more-outputs, or multi-variable fuzzy logic, RTO plus optimization or blending, wherein multiple inputs are used to produce multiple outputs. Of course, any other multi-variable blocks could be used as well.

Referring again to FIG. 1, in one embodiment of the present invention, the controller 12 includes a diagnostic data collection unit 48 which may be, for example, a short term memory that collects and stores certain kinds of data associated with each of the function blocks (or shadow function blocks) of the process control system 10 for use in detecting problems with those function blocks, or the devices or loops associated with those function blocks. The data collection unit 48 may, for example, collect and store a variability indication, a mode indication, a status indication and/or a limit indication for each of the function blocks within the process control network 10. If desired, the data collection unit 48 may perform some processing on the collected data as described below. The data collection unit 48 periodically sends the collected or processed data to the operator workstation 13 via the ethernet connection for storage in a long term memory or historian 50 and for use by a diagnostic tool, 52 located at least partially within the operator workstation 13. The diagnostic tool 52, which is preferably implemented in software stored in a memory of the operator workstation 13 and executed by a processor 54 of the operator workstation 13, detects problems within the process control system 10, reports these problems and suggests tools for use in further analyzing and correcting these problems. If desired, portions of the diagnostic tool software can be executed within the controller 12 or even within the field devices.

The diagnostic tool 52 systematically detects problems using one or more operating parameters of the function blocks or devices within the process control system 10 including, for example, a variability parameter, a mode parameter, a status parameter and a limit parameter determined by (or associated with) each of the function blocks or devices within the process control network 10. An indication of the variability parameter can be calculated or otherwise determined for each device or function block within the process control system (whether those function blocks are implemented within the controller 12 or down within one of the field devices 19–22) to indicate the error between two parameters of the function block. These two parameters may be different signals associated with the function block or may be two different measurements of the same signal. For example, for AI function blocks, the variability indication may indicate the error between a statistical measure (such as the mean, median, etc.) of the measurement made by a sensor over a predetermined amount of time and the actual or instantaneous value of the measurement. Similarly, for an AO function block, the variability indication may be calculated based on the differences between an historical statistical state of a device over a predetermined amount of time (such as the average location of the valve in a valve device) and the current state of the device (such as the current location of the valve). For control function blocks, such as PID, ratio or fuzzy logic function blocks and or for any multi-variable control block, the variability indication may be based on a deviation of a process parameter input to the function block and a set point or target provided to the function block for that parameter.

In one embodiment, a variability index may be determined as the integrated absolute error (IAE) over a particular interval, such as a ten minute evaluation period. In such a case, the variability index can be calculated as:

$$IAE = \sum_{i=1}^{N} \frac{|X(i) - S|}{N} \quad (1)$$

wherein: N=the number of samples in the evaluation period;
X(i)=the value of the ith sample of the desired function block parameter, such as the input to the function block for AI blocks and control blocks; and
S=the statistical or target value of the parameter to which the function block parameter is compared, e.g., the set point (for control blocks), the average value of the function block parameter over the last evaluation period (for AI blocks), etc.

If the variation between the X and S variables of equation (1) is Gaussian in nature, then the IAE is equal to the standard deviation times the square root of the product of two over pi. Of course, any other variability indication could be used in addition to or instead of the IAE calculation described above and, thus, the variability indication is not confined to that of equation (1).

Preferably, each function block, and especially those located within the field devices 19–22, automatically calculates a variability indication over each evaluation period (e.g., over a predetermined amount of time or number of execution cycles) and, after each evaluation period, sends the calculated variability indication to the data collection device 48 within the controller 12 or to the data historian 50 within the operator workstation 13. This variation indication may be, for example, the variability index given above or may be subparts thereof which can be used to determine the variability index given above. If the function blocks are Fieldbus function blocks located within one of the field devices 19–22, then the variability indication may be sent to the controller 12 using asynchronous communications. While the final variability index for each function block could be completely calculated by the controller 12 or the operator workstation 13, this would require each function block to send data to such devices after every execution cycle (typically on the order of every 50–100 milliseconds), which would require a lot of additional communications over the buses of the process control network 10. To eliminate this additional communication, it is preferable to design each function block to calculate a variability indication therefor and then send this variability indication over the communication buses once every evaluation period, which will typically be on the order of once every minute, ten minutes or more. Currently, no known standard function blocks or multi-variable function blocks provide this capability and, therefore, it should be added to the function blocks used within the process control system 10.

In one embodiment, the calculations for a final variability index associated with a function block are split between the function block and the diagnostic tool 52. In particular, because the computation of the variability index takes computing resources, the most computationally consuming parts of these calculations are done in the workstation 13 or the controller 12. For this discussion, the calculations for a variability index for input and output blocks will be referred to simply as a variability index (VI) while the variability index for control function blocks will be referred to as a control index (CI). The VI (which is used for input blocks, output blocks and control blocks in manual mode) and the CI (which is used for control blocks in auto mode) can be calculated by the workstation 13 or the controller 12 as follows:

$$VI = 1 - \frac{S_{lq} + s}{S_{tot} + s} \quad (2)$$

$$CI = 1 - \frac{S_{lq} + s}{S_{tot} + s} \quad (3)$$

wherein:
$S_{lq}$=minimum standard deviation expected with feedback control;
$S_{tot}$=actual measured standard deviation; and
s=sensitivity factor used to make the calculations stable.

$S_{lq}$ may be calculated as:

$$S_{lq} = S_{capab}\sqrt{2 - \left[\frac{S_{capab}}{S_{tot}}\right]^2} \qquad (4)$$

wherein:

$S_{capab}$=estimated capability standard deviation (standard deviation at process ideal operation).

A small bias value s is added to the $S_{capab}$ and $S_{tot}$ values in equations (2) and (3) because it has been discovered that, if the disturbance to noise signal ratio (i.e., the low frequency to high frequency disturbance ratio) is too high, the VI and CI calculations give too high of values. Fast sampling with very small differences between consecutive measurements also attributes to this problem. The bias value s, it has been found, makes the computations stable. The recommended bias value s is 0.1% of the measurement range (approximately the measurement accuracy). It will be understood that a value of zero for the VI or CI calculations of equations (2) and (3) is the best case while a value of one is the worst case. However, these or other variability indices could be calculated so that a value of one (or even some other value) is the best case.

For multi-variable blocks, an individual CI or VI value may be calculated for each controlled index, for example, each input or output to the multi-variable block, using the equations given above and a final CI or VI value for the multi-variable block may be computed as some combination of the individual CI or VI values. For example, the final CI value for a multi-variable block may be computed as:

$$CI_F = \frac{1}{L}\sum_{i=1}^{L} CI(i) \qquad (5)$$

Here, L is the number of individual CI values (i.e., control indices) associated with the multi-variable block and $CI_F$ is the final value for the CI parameter for the multi-variable block. It will be understood from equation (5) that the $CI_F$ value is an average or a weighted average of the control indexes for the individual controlled variables of the multi-variable block. However, the $CI_F$ value could be determined as some other statistical combination of the individual CI values instead. Of course, a similar approach could be taken with the VI value for a multi-variable block. Also, the computation of the $CI_F$ or the $VI_F$ values could be performed in the device in which the multi-variable function block exists, or in the controller 12 or the historian 13 or other processor device.

If desired, a percent improvement (PI) value can be established for the control blocks as 100 times the CI value for the control block. It may also be desirable to compute the variability improvement for a particular variable which results from the use of advanced control for that variable. In this case, an advanced control improvement index (ACII) can be calculated as the ratio of the minimal control index ($CI_{min}$) achieved over a certain period of time using non-multi-variable control (e.g., a single-input, single-output control loop) over the control index ($CI_F$) for the multi-variable block used to control that variable in the multi-variable control scheme.

In the case of plant optimization, the objective of the plant may be specified by an objective function, in which case, the measurement of the total and capability standard deviations will be based on the difference between the optimum value achievable and that actually realized by the control application. For most control applications, the optimum performance is achieved when constrained process inputs are as close to the constrained limits as possible. Therefore, an optimality index may be defined as a percent of time in which at least one process input was at its constraint, or within a predefined range or value of a constraint. A constrained violation index may also be defined as the amount of time that at least one process input or output exceeds its constraints. For monitoring applications, such as multi-variable virtual sensors, a variability index can be determined from the total and capability standard deviations resulting from the difference between the predicted measurement value (the output of the virtual sensor) and the value determined based on lab tests.

To perform the above VI, CI and PI calculations in the most efficient manner possible, each of the function blocks in, for example, the DeltaV environment or the Fieldbus environment may calculate the $S_{capab}$ and $S_{tot}$ values for each of the appropriate inputs or outputs of the block as variability indications and make these values visible to the controller 12, which can then calculate the VI and CI values using equations (2), (3) and (5) or can provide the $S_{capab}$ and $S_{tot}$ values to the diagnostic tool 52 in the workstation 13 which can calculate the VI and CI values. The intermediate calculations needed to determine the $S_{capab}$ and $s_{tot}$ values will be performed each execution of the function block and the $S_{capab}$ and $s_{tot}$ values will be updated once every N-executions of the function block (i.e., once every evaluation period). In one implementation, the $S_{capab}$ and $S_{tot}$ values may be updated after 100 executions of the function block.

The total standard deviation $S_{tot}$ can be calculated in the function block using the so-called moving time window computation as follows:

$$S_{tot} = 1.25 \text{ MAE} \qquad (6)$$

wherein MAE is the mean absolute error calculated as:

$$MAE = \frac{1}{N}\sum_{t=1}^{N} |y(t) - y_{st}| \qquad (7)$$

and wherein:

N=the number of executions in an evaluation period;

y(t)=the value of the t'th instantaneous sample of the desired function block parameter, such as the input to the function block; and $y_{st}$=the statistical or target value of the parameter to which the function block parameter is compared, e.g., the average or mean value of the function block parameter over the last evaluation period.

Generally speaking, the process value (PV) of the function block will be used in the I/O blocks to calculate $y_{st}$. In control blocks, either the working setpoint or the PV can be used as $y_{st}$ depending on the block mode.

The capability standard deviation, $S_{capab}$, can be calculated as follows:

$$S_{capab} = \frac{MR}{1.128} \qquad (8)$$

wherein MR is the average moving range, which may be calculated as:

$$MR = \frac{1}{N-1}\sum_{t=2}^{N} |(y(t) - y(t-1))| \qquad (9)$$

To reduce computations, only the summing component associated with the MAE and MR will be done during each execution cycle of the function block. The division of the sum by N or N−1 can be done as part of the $S_{tot}$ and $S_{capab}$ calculations once every N executions (i.e., once every evaluation period). From the above formulas it is evident that:

$$S_{tot} = 1.25 * \frac{1}{N} * Error_{abs} \tag{10}$$

$$S_{capab} = \frac{\frac{1}{N-1} * Delta_{abs}}{1.128} \tag{11}$$

wherein the $Error_{abs}$ and the $Delta_{abs}$ are the summations in equations (7) and (9) respectively and are calculated on an ongoing basis during each execution cycle of the function block.

Of course, the quality of the input to the function block used in these calculations is important and, thus, it is desirable to only use data that has good status and data that is not limited. When using Fieldbus or DeltaV function blocks, the mode variable takes the status of the PV, set point and BackCalibration variables into account, and so the mode variable can be used to assure proper calculations for the variability index. For example, in the DOS (out of service) mode, the $S_{tot}$ and $S_{capab}$ variables are not determined but are, instead, set to the best case value (e.g., zero) to prevent the detection of an error. On warm starts, if the mode changes from OOS to any other mode, the $S_{tot}$ and $S_{capab}$ variables can be set to zero (a best case value), the scan counter can be reset and the $Error_{abs}$ and $Data_{abs}$ variables of equations (10) and (11) can be set to zero. Also, the previous values of y and $y_{st}$ should be reset.

Figure 3:
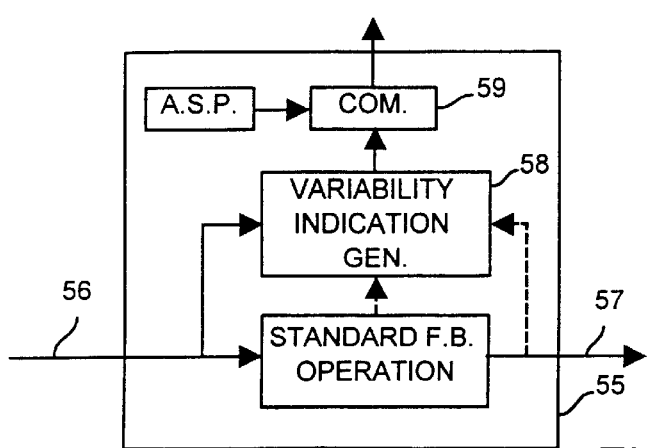
FIG. 3 is a block diagram of a function block having a variability indication generator therein.

FIG. 3 illustrates a function block 55 having an input 56, an output 57 and a variability indication generator 58 connected to the input 56. If desired the variability indication generator 58 may be additionally or alternatively connected to the output 57 and/or to other parts of the function block 55 to receive other function block parameters or signals (these connections being illustrated by dotted lines in FIG. 3). If the function block 55 is, for example, a control function block, the variability index calculator 58 receives the input 56 (which may be the process value that is being controlled by the loop in which the control block 55 operates) and compares that input to a set point previously supplied to the function block 55. The variability indication generator 58 may determine the variability index according to equation (1) and send that index to a communicator 59 which sends the variability indication to the controller 12 every evaluation period (every N samples). However, as described above, the variability indication generator 58 may determine the $S_{tot}$ and $S_{capab}$ values in the manner described above and send these values to the controller 12 or workstation 13, which can determine the VI and/or CI values therefrom. If the function block 55 is a function block being executed within the controller 12, the controller 12 could include a separate routine to determine the variability indication for each function block, as no bus communications would need to take place after each sample interval. The communicator 59 can be any standard communication unit associated with a function block or a communication protocol.

Figure 11:
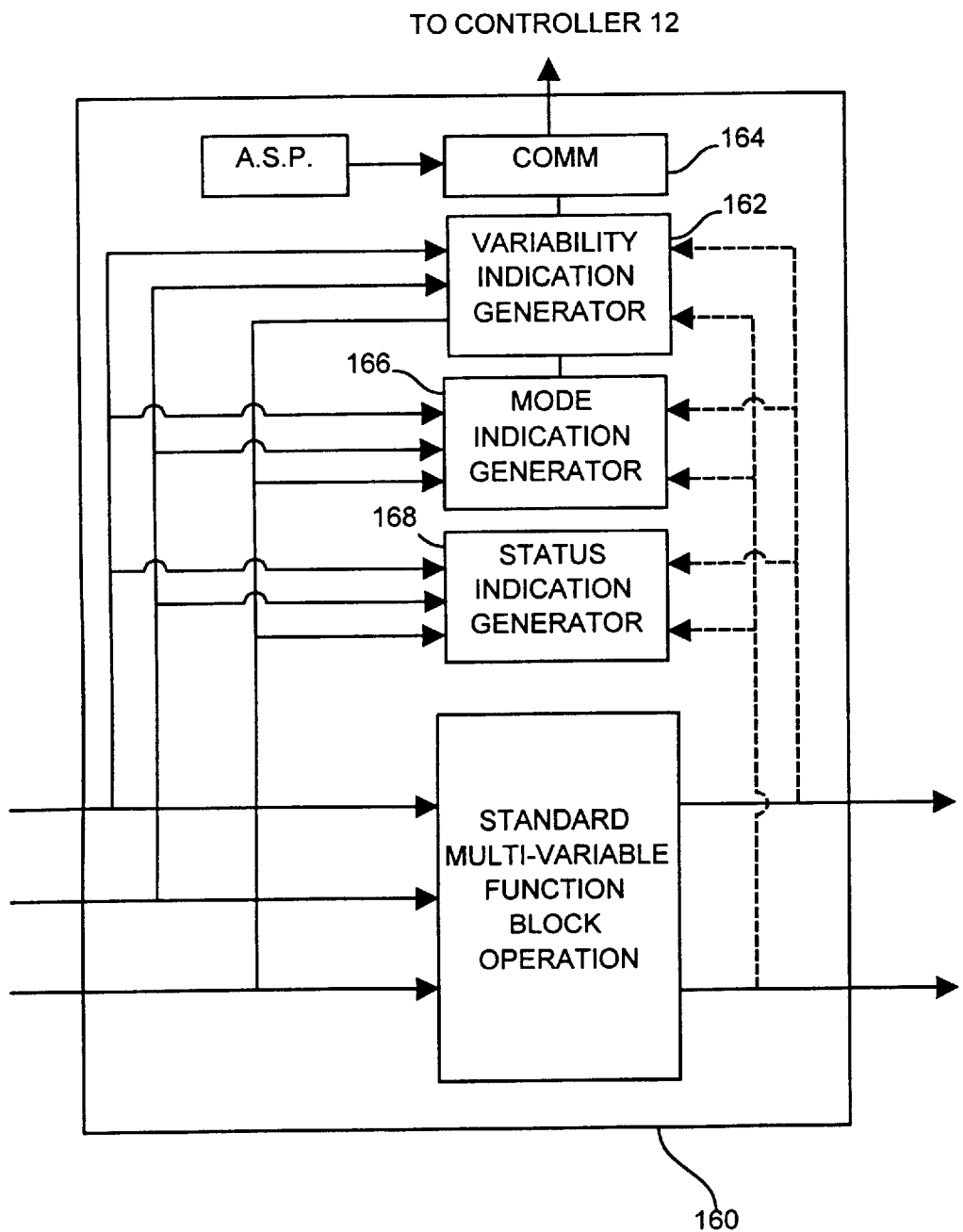
FIG. 11 is a block diagram of a multi-variable function block having a variability indication generator, a mode indication generator and a status indication generator therein.

Of course, a variability index generator may also be provided in a multi-variable block, as is illustrated in more detail in FIG. 11. In particular, FIG. 11 illustrates a multi-variable block 160 having three control inputs and two outputs. Of course, if desired, more or less inputs, including constraint and set point inputs or more or less outputs could be used as well. The block 160 includes a variability index generator 162 which is connected to each of the inputs and which may be connected to one or more of the outputs and computes a CI (or VI) for each of the inputs in any of the manners discussed above. Thus, the variability index generator 162 may compute the $S_{tot}$ and $S_{capab}$ values for each input and/or output and send these values to the controller 12 or may compute initial VI or CI and send these values to the controller 12 or, alternatively, may compute the final $VI_F$ or $CI_F$ values using, for example, equation (5), and send these values to the controller 12. As is the case with the block of FIG. 3, the variability index generator 162 is coupled to a communication unit 164 which communicates the variability index(es) for the block 160 to the data collection unit 48 of FIG. 2.

A second function block operating parameter that may be used to determine problems within the process control system 10 is an indication of the mode in which each of the function blocks (or loops or devices) is operating. In the case of Fieldbus function blocks, as well as some other known function blocks, each function block has a mode parameter that is available to the controller 12 to indicate the mode in which the function block is operating. From this mode indication, a data analyzer within the diagnostic tool 52 can determine a value of the mode parameter to indicate if the function block (and thereby the loop, module or device) is operating in its desired or designed mode or, alternatively, if something has occurred to cause the function block (device or loop) to operate in a different, less preferable mode. Fieldbus function blocks operate in one of a number of modes. For example, AI function blocks operate in an out-of-service mode (wherein an operator may have put the device out-of-service to perform maintenance), a manual mode in which some signal, such as an output of the function block, is being set manually instead of based on the designed operation of the function block, and an automatic mode, in which the function block is operating in a normal manner, i.e., the way in which it was designed to operate. Fieldbus control blocks can also have one or more cascade modes wherein the mode is controlled by other function blocks or by an operator. Typically, Fieldbus function blocks have three mode variables associated therewith at any given time including a target mode, which is the mode in which the operator has set the block to operate (which can be other than the normal or automatic mode), an actual mode, which is the mode in which the control block is actually operating at any given time, and a normal mode, which is the mode in which the function block was designed to operate and is associated with the normal operation of the function block. Of course, these or other mode indications may be used as desired.

In the case of multi-variable blocks, each of the inputs or outputs can have a separate mode associated therewith. As illustrated in FIG. 11, a mode indication generator 166 may detect the mode of the inputs and outputs of the block and compare these mode indications to the normal mode for each of the inputs and outputs to determine if the block 160 is operating in an abnormal or non-designed mode. The mode block 166 may determine or set the overall mode indication of the multi-variable block 160 based on some combination of the individual mode indications. For example, the overall mode indication for the multi-variable block 160 may be set to one to indicate that the block 166 is operating outside of the designated mode when any of the mode indications for any of the individual inputs or outputs is other than the designed mode. If the block 160 is a Fieldbus function block, it will have a mode attribute which can be used to determine if the block is operating in the designed or normal mode. If the block 160 is not a Fieldbus function block, the mode indication generator 166 can be designed to calculate or determine an actual mode attribute in a way which is similar to Fieldbus function blocks and to then compare this calculated actual mode attribute to a designated normal mode attribute (provided by a designer or user) to determine if the block 160 is operating in an incorrect mode.

The mode indication(s) may be periodically provided to the controller 12 and/or to the operator workstation 13. If the function block is within the controller 12, the mode indication for each function block may be provided to the data collection unit 48 at any desired time or interval. For Fieldbus function blocks or other function blocks within the field devices, the controller 12 may periodically request the mode parameters for each function block using a ViewList request (in the Fieldbus protocol). If desired, the data collection unit 48 within the controller 12 may store the mode at each sampling period or evaluation period and provide the stored data to the data historian 50. Thereafter, the diagnostic tool 52 may determine mode values indicating when or how long the function block spent in the different modes or in a normal mode (or a non-normal mode) or indicating what percent of a specific time period the function block was in a normal mode (or a non-normal mode). Alternatively, the data collection unit 48 or some other specifically designed unit within the controller 12 could detect when each function block is out of its normal mode by, for example, comparing the function block's normal mode with its actual mode at any given time. In this case, the data collection unit 48 could communicate the mode of any function block by indicating when changes in the mode took place or are detected, which reduces the amount of communication needed between the controller 12 and the operator workstation 13.

A status parameter is another function block operating parameter that may be used to detect problems within process control devices and loops. A status indication provided by each function block may define or identify the status of the primary value (PV) associated with the function block or device. In addition or alternatively, one or more of the inputs and outputs of a function block may have a status indication associated therewith. Fieldbus function blocks have a status parameter associated therewith which can take on the form of "good", "bad" or "uncertain" to indicate the status of the function block PV, inputs and/or outputs. A status indication may also identify or include a limit indication, such as the limits associated with the PV or other function block parameter. Thus, for example, the limit indication may indicate whether the PV of the function block is high or low limited. Again, the diagnostic tool 52 may determine status values or limit values indicating when, how long or what percent of a specific time period the status of the function block was a normal status (or a non-normal status), and when, how long or what percent of a specific time period a function block variable was at one or more limits (or not at the one or more limits), or was a bad status or a questionable status.

In the case of multi-variable blocks, each of the inputs or outputs can have a separate status associated therewith. As illustrated in FIG. 11, a status indication generator 168 may detect the status of all of the inputs of the block 160 that directly impact the control or calculation performed by the block 160. The status indication generator 168 may determine an overall status value for the block 160 based on some combination of the individual status indications. For example, the status indication for the multi-variable block 160 may be set to bad, uncertain or limited if any one of the monitored signals has a status that is bad, uncertain or limited. If the block 160 is a Fieldbus function block, it will support a status attribute for each of the primary variables, which can be used to support the status attribute. If the block 160 is not a Fieldbus function block, the status indication generator 168 can be designed to calculate or determine an actual status for each of the primary inputs or outputs in a way which is similar to Fieldbus function blocks and to then use these status indications to determine an overall status indication for the block 160. The status indication generator 168 may treat limit indications for each of the input or outputs of a multi-variable block in a similar manner.

Similar to the mode indication, the status indication and the limit indication may be sent by each function block to the controller 12 periodically or on request (using, for example, the ViewList command in the Fieldbus protocol) and changes therein may determined by the controller 12 and sent to the operator workstation 13. Alternatively, the status and limit indications may be sent to the operator workstation 13 without being processed. If desired, the function blocks may be set up to communicate mode, status and/or limit indications only when changes therein actually take place, which further reduces the amount of communications between the controller 12 and the function blocks within field devices. However, when using this communication scheme, the current state of all the required parameters is needed to establish a base against which to compare the changes when the diagnostic tool 52 is first placed on line. This current state may be measured or collected by having the controller 12 periodically report parameter values (even though they have not changed) or by having the diagnostic tool 52 cause the controller 12 to report parameters defined for exception reporting. Based on the status of each of the function blocks, the diagnostic tool 52 can quickly identify measurements which are bad, and need attention (uncertain status) or which have been incorrectly calibrated because they have a measurement or PV that is limited. Of course, the status and limit indications may take on one of any different number and types of values, depending on the type of system in which they are being used.

Furthermore, a status indication may be used for any different variables (other than the PV) of a function block, device or loop. For example, in a control loop having feedback control, the status of the feedback variable may be used to detect problems within function blocks and loops. The status of this feedback variable (e.g., the back calibration or BackCal variable for control or actuator function blocks in the Fieldbus protocol), or any other variable, can be examined by the diagnostic tool 52 to detect when a function block has an output that is limited by, for example, a downstream function block or other downstream condition. Similar to the mode indication, the controller 12 may detect and store actual status values or may store changes in the status values as the status indication.

Other data associated with a process control function block, device or loop may be used to detect problems as well. For example, the operator workstation 13 (or the controller 12) may receive, store and review events and alarms generated by the devices or function blocks within the process control network 10. In, for example, the Fieldbus environment, function blocks support a block error parameter that reports abnormal processing conditions detected by a transducer or a function block. Fieldbus devices reflect any problem that is detected by the device or function block using one of 16 defined bits in a block error bitstream sent to the controller 12. Fieldbus devices report the first detected problem to the controller 12 as an event or alarm and these events or alarms can be forwarded by the controller 12 to an operator workstation 14 event journal. In one embodiment, the diagnostic tool 52 analyzes or reviews the 6th bit of the block error parameter (in the Fieldbus protocol) to detect when a device needs maintenance soon and, thus, when a condition exists that must be addressed but which is not currently limiting device operation. Similarly, the diagnostic tool 52, analyzes the 13th bit of the block error parameter (in the Fieldbus protocol) to determine when correct device operation is not possible because of a condition detected by the device and, thus, immediate action is required. Of course, other events, alarms, other bits within the block error parameter or other types of error indications may be used by the diagnostic tool 52 to detect problems associated with the operation of the process control network 10, and such other events, alarms etc. may be associated with the Fieldbus protocol or any other desired device or controller protocol.

In some instances, function blocks may have parameters, such as mode or status parameters that are set to other than normal or good for reasons unrelated to the correct operation of the process or loop in which these function blocks operate. For example, in batch processes, when a batch is not being run, the modes of the function blocks used within that process are set to non-normal values. However, it would be undesirable to detect these non-normal mode (or status) indications and identify problems with the system based thereon because the batch process is designed to have down times. It is preferable, therefore, to provide each function block (or the module or loop in which it is run) with an application state parameter indicating if the function block (or module) is purposely in a non-normal mode, or has a bad status. In other words, the application state parameter will indicate when alarming or problem detection for the function block should be prevented. For function blocks used in batch processes, for example, the application state parameter will be set to one value to indicate when the function blocks are operating to perform a batch run application and will be set to another value to indicate when the function blocks are purposely not being used to perform a normal function within a batch run application and so no detection of problems should be based on the operations of these function blocks at these times. Such an application state parameter is illustrated in FIGS. 3 and 11 to be communicated to the controller 12 via the communicators 59 and 164. The controller 12 and/or operator workstation 13 may detect the application state parameter for each function block and ignore data (such as variability, mode, status and limit data) associated with function blocks that are in the second category, e.g., that are purposely set to non-normal or bad states, in order to prevent false alarms. Of course, there are other reasons that the application state parameter may be set to prevent detection of problems besides the down time associated with batch processes.

Figure 4:
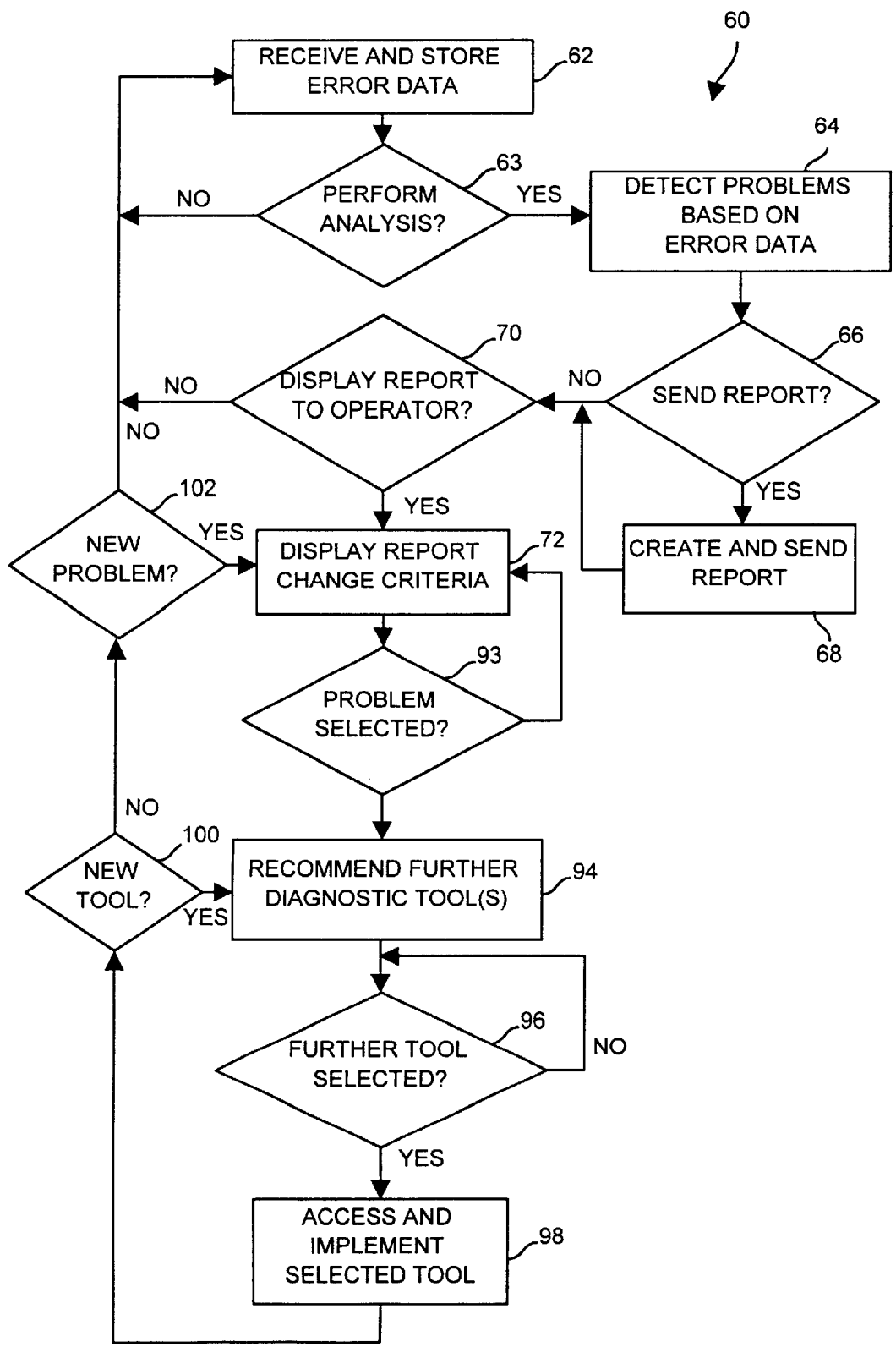
FIG. 4 is a block diagram of a routine implemented by a diagnostic tool to perform diagnostics in the process control system of FIGS. 1 and 2.

The diagnostic tool 52 is preferably implemented in software within the operator workstation 14 and, if necessary, some parts may be implemented in the controller 12 and even down within the field devices, such as the field devices 19–22. FIG. 4 illustrates a block diagram of a software routine 60 that may be executed in the operator workstation 14 to detect and help correct problem function blocks, devices, loops or other entities within the process control network 10. Generally speaking, the software routine 60 collects data pertaining to each of the function blocks within a process, such as variability indication, mode indications, status indications, limit indications, alarm or event information, etc. on an ongoing basis as the process is running and detects the existence of problem measurements, calculations, control loops, etc. based on the collected data. The software routine 60 may send a report or create a display listing each detected problem and its economic impact on plant operation when configured or requested to do so. When viewing a display of the detected problem loops on, for example, the display 14 of the operator workstation 13, an operator can select a particular problem for review or correction. The software routine 60 then suggests and may automatically implement other diagnostic tools to further pinpoint the problem or to correct the problem. In this manner, the diagnostic tool 52 processes data generated by the function blocks or devices of a process control system, automatically recognizes problems based on the data and then suggests and executes other diagnostic tools to further pinpoint the cause of the problem and to correct the problem. This saves the operator enormous amounts of time and effort in detecting and correcting problems within a process control system and also helps to assure that the appropriate diagnostic tools (which may not be totally familiar to the operator) are used to correct the problem.

A block 62 of the routine 60 receives and stores the variability, mode, status, limit, alarm, event and other data used to detect problems within devices, blocks and loops of the process control system 10 on an ongoing basis, i.e., whenever the process is running. Preferably, this data is stored in the data historian 50 within the operator workstation 13. Alternatively, however, this data could be stored in any other desired memory, such an in a memory associated with the controller 12. Likewise, this data may be sent to the operator workstation 13 in any format and may be sent as compressed data, if so desired.

A block 63 detects or determines when an analysis of the data is to be performed because, for example, a periodic report is to be generated or because a user is requesting such an analysis. If no analysis is to be performed, the block 62 simply continues to collect data and may process that data to determine values for the function block operating parameters. If an analysis is to be performed, a block 64 analyzes the stored data or stored parameter values to determine which function blocks, devices or loops may be having problems. Generally speaking, the data may be analyzed based on the current or instantaneous values of the function block operating parameters, or may be analyzed on an historical basis to determine which function blocks, devices or loops are having problems over a specific period of time. The historical analysis helps to detect problems that are long term in nature based on the performance over a specified period of time. To detect a problem, the block 64 may, if necessary, calculate a variability index from the variability indications supplied by the function blocks and then compare the variability index to a specific range or limit (which may be set by the operator) to see if either the instantaneous value of, or some statistical measure of the historical value (such as the average or median value) of the variability index is outside of the range or above or below the specified limit for a function block. If so, a problem may exist and the function block, device or loop associated with the out-of-range variability index is listed as having a problem to be corrected.

Likewise, the block 64 may compare the actual mode of a function block or device with the normal mode of that function block or device to see if they match. As indicated above, the controller 12 may perform this function and send indications of the result, or of mismatches to the historian 50. If desired, however, the operator workstation 13 may perform these comparisons directly. Using the historical data, the block 64 may determine loop utilization, i.e., the percent of time that the loop (or function block) operated in the designed (normal) mode. In the instantaneous analysis, the function block, loop or device may be considered to have a problem when it is currently not operating in the designed or normal mode.

Similarly, the block 64 may analyze the status and limit indication(s) of each function block to determine when the status is bad or uncertain or otherwise not a designed or normal status or when a function block signal is at a limit. A historical analysis may calculate or determine if a particular function block has a status indication that is bad or uncertain for a predetermined percentage of a specified amount of time, may determine which PVs or other variables reached a limit or stayed at a limit for a predetermined percentage of a specified amount of time, or may analyze the status indication or limit indication in any other manner to determine if a problem exists within the function block or device or loop in which a function block is located. Likewise, the block 64 may determine, in an instantaneous evaluation, which function blocks, devices or loops have status values that are currently not in the designed or normal state and/or which signals or variables have reached a limit (i.e., are value limited). The block 64 may review the alarm and event notifications to see if any devices need maintenance, either now or in the future. The blocks which exceed the variability or control index limits and the blocks which have an active bad, limited, or mode condition will be identified and temporarily saved. This summary information can support the creation of "current" summary display. The instantaneous values and conditions can be integrated by the diagnostic tool 52 on, for example, an hour, shift and daily basis to obtain the average value of variability index and the percent improvement and the percent time the bad status, limited signal or non-normal mode condition existed. Of course, the block 64 may perform other types of processing on the variability, mode, status, limit, event, alarm and/or any other desired data to detect problems. Furthermore, the block 64 may run the analysis using different limits, ranges, historical times, etc., all of which may be set by a user or an operator.

For function blocks used in, for example, batch mode processes, data associated with times when a function block intentionally was not operating is discarded or not used in the analysis based on the application state parameter for the function block.

After the block 64 has detected the problems within the process control network, a block 66 determines if any written or electronic reports should be generated because, for example, periodic reports have been requested by a user. If so, a block 68 creates a report listing the problem function blocks, devices, loops, etc. and their economic effect on the process control system. Such an economic impact may be determined by having an operator or other user specify the dollar amount associated with each percentage point of reduced operation of the process or a loop in the process. Then, when a loop is found to have a problem, the actual performance of the process loop may be compared to a known optimum performance value to determine the percentage difference. This percentage difference is then multiplied by the specified dollar amount to percentage point ratio to determine the economic impact in terms of dollars. The report may be printed out on a printing device, displayed on a computer screen (such as the display 14) or other electronic display, sent to a user via E-mail, the Internet or any other local area or wide area network, or may be delivered to a user in any other desired manner. If desired, the diagnostic tool 52 may be configured to automatically notify a plant maintenance system whenever a problem loop is detected and this notification can be sent to the maintenance system as an event using the event/alarm capability of the known OPC interface.

Figures 5, 6, 7:
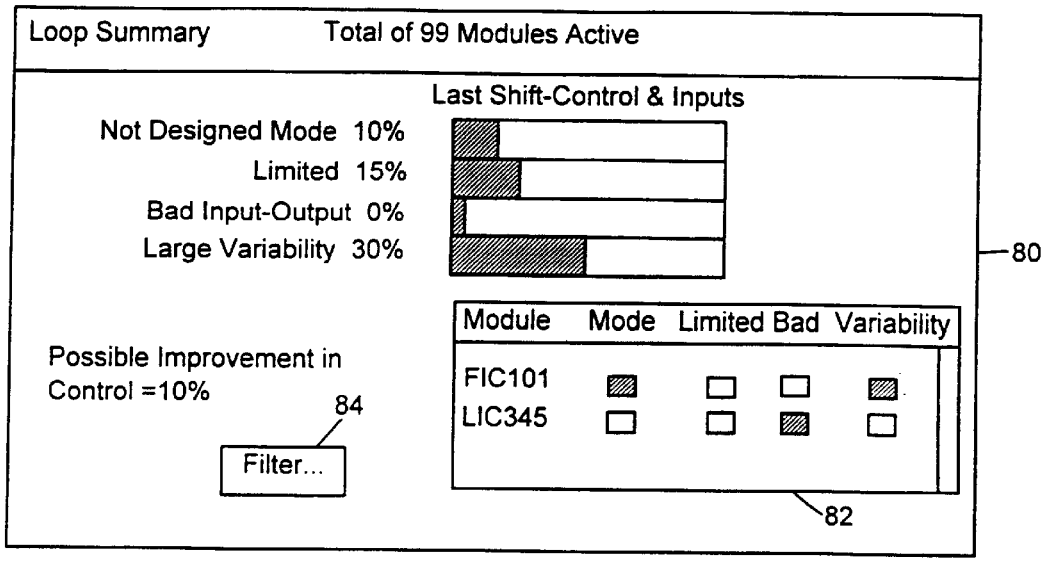
FIG. 5 is a first example screen display generated by the diagnostic tool used in the process control system of FIGS. 1 and 2.
FIG. 6 is a second example screen display generated by the diagnostic tool used in the process control system of FIGS. 1 and 2.
FIG. 7 is a third example screen display generated by the diagnostic tool used in the process control system of FIGS. 1 and 2.

A block 70 determines if an operator has requested an analysis to be performed at the workstation 13 and, if so, a block 72 enters a display or dialog routine that enables a user to find out different information related to the problem or to select different parameters for performing the analysis. In one embodiment, an operator or other person that uses the diagnostic tool 52 is presented with a dialog when he or she logs onto the workstation 13. The dialog summarizes the conditions that need to be addressed in the system without identifying the loops that are the source of the problem. The dialog may convey the information in a graphical format such as on screen display 80 as shown in FIG. 5. The screen display 80 summarizes the percent of total input, output or control function blocks in the process or plant that currently violate the default limits set for utilization (mode), limited signals, bad status or high variability. Because multiple conditions may exist in a single block, the total could potentially exceed 100%. If the total exceeds 100 percent, then the percent for each category can be scaled so that the total equals 100 percent. Modules that have input, output, or control blocks that violate the preset limits are summarized in a tabular list 82. In FIG. 5, module FIC101 has one or more function blocks operating in undesigned modes and one or more function blocks with high variability, while the module LIC345 has one or more function blocks with bad status.

More information about the nature of the problems, such as the limits associated with the function blocks, can be shown graphically by, for example, clicking on a module name within the list 82. Furthermore, by selecting a filter button 84 on the screen of FIG. 5, the user may be presented with a dialog allowing the user to select a summary time frame, the types of blocks to be included in the summary and the limit for each category or block. Such a dialog screen 86 is illustrated in FIG. 6, where the limits for the mode, limited, and bad status of input blocks are set at 99 percent utilization and where the limit for the variability index for input blocks is set at 1.3. In this case, the percent utilization of a block is determined as the percent of a specific time period in which the mode or status is normal and a function block signal was not limited. However, the limits could also be set as the percent of time that the mode or status was non-normal or a function block variable was at a limit, in which case the limits should be set closer to zero. Of course, by choosing all of the loop selections within the screen 86, all modules that include an input, output or control block will be included in the summary.

A Timeframe box 88 of the screen 86 can be manipulated by changing the setting therein to alter the historical time frame for which the analysis is performed. For example, by choosing a "Now" selection within the Timeframe box 88, the instantaneous or current value of the block parameters are used to determine if each module will illustrated as a problem module in the summary list 82. While any time frame may be specified, some example time frames that can be used in filtering are the Current Hour or Last Hour, Current Shift or Last Shift, Current Day or Last Day, etc. For these time frames, a module is included in the summary list only when a detected condition is present for a significant portion (i.e., a predetermined portion) of the selected time frame as defined by the limit condition.

If desired, the user may change the limit values used for variability index, either per block or on a global basis. To facilitate setting variability limits, the user may select the desired limit to be changed and then may be provided with a choice of either editing that limit for a particular block or of setting that limit for all of the blocks simultaneously. When the user wants to set the variability limit for all of the blocks together, the user is presented with a dialog box that allows the variability limit to be set to the current value of a variability plus a specified bias provided by the user. Of course, the limits for variability, mode, status and limited variables may be applied to all of the function blocks within a module, an area, a system, or any other logical unit and may all be changed in a similar manner. Default limits may be initially provided for a configuration as 1.3 for variability index and 99% utilization for mode, limited and status indications. Of course, these default values may be changed from the module summary display as described above.

By selecting a module name within the summary 82 of FIG. 5, the user can be provided a dialog screen having further details related to that module. Such a dialog screen 90 is illustrated in FIG. 7, for the module FIC101 using the Last Shift time frame. The screen 90 illustrates the performance of a PID1 block and an AI1 block within the FIC101 module. The information provided in the screen 90 allows the user to easily identify the particular measurement, actuator, or control block that caused the module to be included in the summary and the percent time that the condition was detected. In particular, the percent of time of the last shift that a block was in its normal mode, normal status and not limited is illustrated in FIG. 7 as loop utilization. Of course, the screen of FIG. 7 could be configured to illustrate the percent of time during the last shift that a block was in a non-normal mode, or had a non-normal status or the percent of time in the last shift that a function block variable was at one or more limits. A measure of variation is shown for the blocks illustrated in FIG. 7 along with limits therefor. The variability measure in this case is calculated so that a value of one is the best case and values greater than one indicate more and more variability error. However, using the CI and VI calculations of equations (2) and (3) for the variability index will cause the variability index to be between zero and one, with zero being the best case. In this case, the variability limit should be set to be between zero and one. Furthermore, the percent improvement (PI) that is possible in a control loop is illustrated in FIG. 7 for control blocks, namely the PID1 block. If desired, the percent utilization values that fall below (or above) the respective limits can be highlighted or otherwise marked to indicate the detected problem(s).

Of course, any other screen display may be used to summarize which loops, devices, function blocks or measurements have a high variability index (such as being greater than a user specified limit), operate in a non-normal mode or have process measurements that have bad or uncertain status or that are limited. As noted above, using an historical analysis, the diagnostic tool 52 may provide displays for a specified time frame to identify devices, loops or function blocks that have a variability index, mode, status or limit variable that has changed significantly from its normal value. Of course, the diagnostic tool 52 may enable a user to choose how many and which tests should be used (and must be failed) before a process control condition is identified as having a problem associated therewith.

Referring again to FIG. 4, when a user selects one of the function blocks in, for example, the display 90 of FIG. 7, a block 93 detects the selection of the problem function block and a block 94 displays a set of options to be used to correct the problem block or loop. For example, for control blocks, the diagnostic tool 52 may allow the user to use an autotuner or other tuner to tune a loop or may allow the user to perform trend analysis on the loop. By selecting the autotuner option, the diagnostic tool 52 automatically finds and executes the autotuner application for the selected control block or loop. However, when the trend option is selected, the workstation 13 will begin to collect trending data as describe hereinafter.

For input or an output function blocks, the block 94 may allow the user to, for example, use a further diagnostic tool for that block or to perform trend analysis. If, for example, the selected input or output block is within a Fieldbus or Hart device, then selecting the diagnostics option will activate the diagnostic application for the associated transducer block using tools known in the art such as any device calibration tools. In a DeltaV environment, the asset management solutions (AMS) diagnostic tool manufactured and sold by Fisher-Rosemount can be used for this purpose to communicate with a device, to obtain specific information therewith and to implement diagnostics associated with the device. Of course, other tools or recommendations could be made as well. For example, for transmitter problems, or function blocks associated with transmitters, the block 94 may recommend that a device calibration be used to calibrate the transmitter while, for a valve, any of the valve diagnostic routines can be used to detect and possibly correct the specific problem within the valve. Generally speaking, the recommendations made by the block 94 may be determined based on whether the problem falls into one of a number of predetermined types of problems, the nature or identity of the source of the problem (e.g. whether it originated in a control or input function block, a transmitter or a valve, etc.) or any other desired criteria. Of course, any desired diagnostic tools can be used, including those now known or those developed in the future.

If the specific nature of the problem is not easily detected from the variability, status, mode, limit or other data that pointed to the existence of a problem, the block 94 can recommend the use of other, more complex diagnostic tools, such as plotting routines, correlation (such as auto-correlation and cross-correlation) routines, spectrum analysis routines, expert analysis routines or any other desired routine or tools provided for the process control system 10. Of course, the diagnostic tool 52 may recommend or suggest the use of more than one tool and allow the operator to choose which tool should be used in any situation. Furthermore, the block 94 may limit its suggestions to tools actually available within the process control network 10, e.g., those loaded onto the operator workstation 13, or may suggest tools that would have to be purchased or loaded into the process control system 10 before being used. Of course, the block 94 can also suggest the use of manual tools, i.e., those which are not run on the operator workstation 13, controller 12 or one of the devices 15–28.

After the block 94 recommends one or more further diagnostic tools, a block 96 waits for a user to select a tool for implementation, and, upon receiving such an instruction from the operator, a block 98 finds and executes the selected tool to enable the operator to further analyze and pinpoint the cause of the problem or to fix the problem. After implementing the diagnostic tool, a block 100 enables the operator to select a different tool for the selected problem and a block 102 enables the operator to select a different problem.

In one embodiment, the block 94 can recommend analysis tools typically referred to as trending applications that require the collection of a relatively large amount and/or a lot of samples of data before being able to be run. Examples of such trending applications include a correlation analysis, a neural network, a fuzzy logic control procedure, an adaptive tuning procedure, a spectrum analysis routine, etc. Unfortunately, when the diagnostic tool 52 detects problems, the data required for the trending tool is typically unavailable because this data was not previously collected. This data may be needed to be collected at a high frequency data rate that is not practically achievable using simple communications between the controller 12 and the workstation 13. As a result, when the operator selects a tool that requires the collection of this data (fast data), the block 98 may automatically configure the controller 12 to collect the necessary data from the process control system 10.

Figure 8:
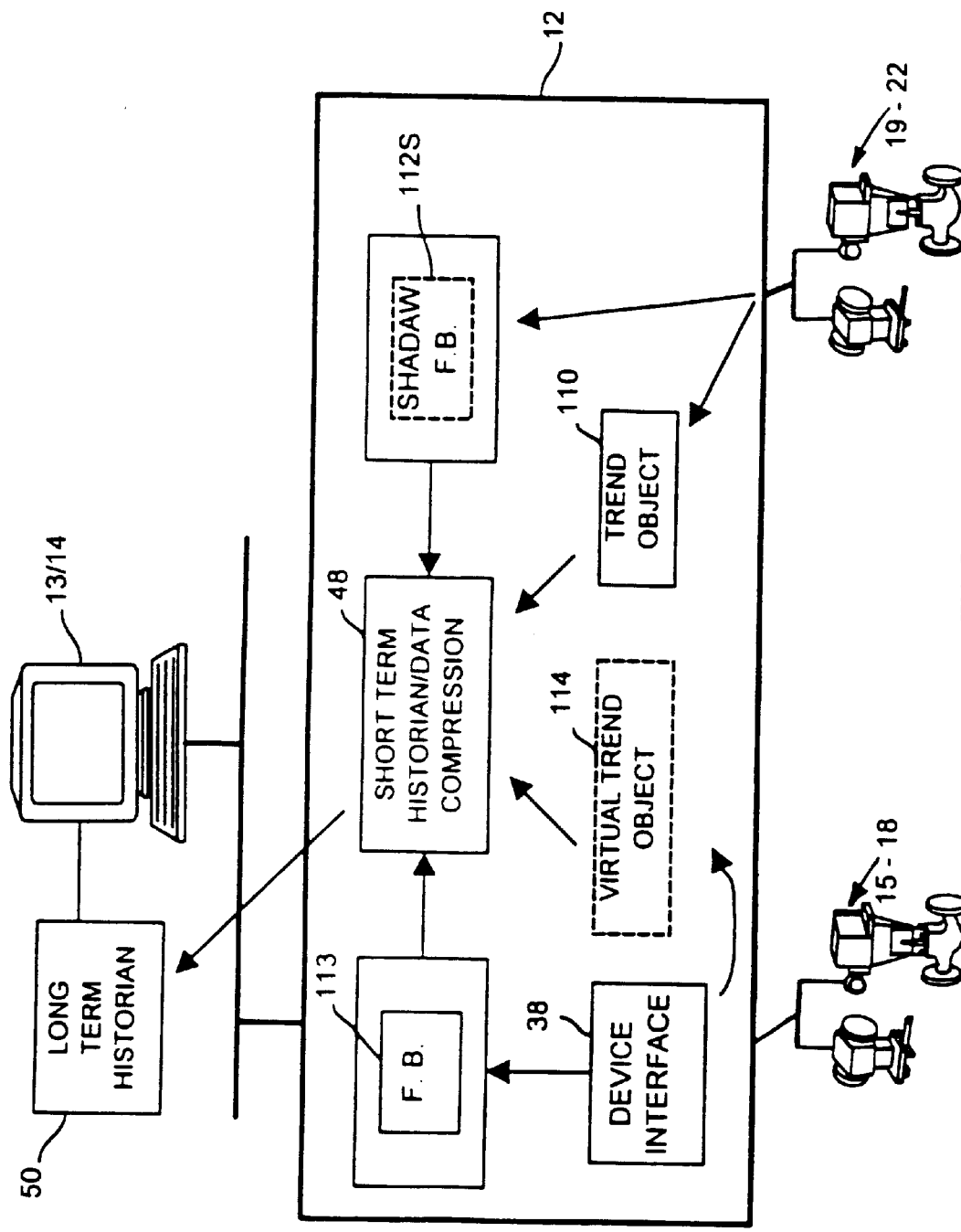
FIG. 8 is a block diagram of the controller and operator workstation of FIGS. 1 and 2, illustrating trending communications associated with a diagnostic tool.

When such data needs to be collected from Fieldbus function blocks or devices, i.e., from the devices via the Fieldbus bus, the controller 12 may use one or more Fieldbus trend objects to collect the data, may bundle and store the collected data as packets of data, and may then send the packets of data to the operator workstation 13 at any desired time so that the fast data is delivered to the operator workstation 13 in a non-time critical manner. This operation reduces the communication load between the controller 12 and the operator workstation 13 for the collection of this data. Typically, a trend object is set up to collect a predetermined number of samples (e.g., 16) of any desired data pertaining to a function block and, when the predetermined number of samples has been collected, these samples are communicated to the controller 12 using asynchronous communications. The use of one or more trend objects 110 for Fieldbus function blocks is illustrated in FIG. 8. The trend object(s) 110 are used to collect and send desired data to the data collection device 48 within the controller 12 and originate within the actual function blocks down within the Fieldbus devices. These trend objects 110 may be provided by the Fieldbus device or by the shadow function blocks (illustrated generally as shadow function blocks 112S in FIG. 8) within the controller 12. Similarly, for function blocks located within and executed by the controller 12 (illustrated generally as function blocks 113 in FIG. 8), virtual trend objects 114 can be set up within the controller 12 to collect the desired data delivered from the 4–20 ma (or other devices). Samples for such virtual trend objects 114 may be collected at any desired rate, such as every 50 milliseconds. The virtual trend objects 114 may be configured to be similar to the actual trend objects of the Fieldbus protocol and are delivered to the data collection device 48. The data collection device 48 delivers the collected data to the data historian 50 within the operator workstation 13 as noted above.

The trend objects 110 and 114 are collected until enough data has been stored to run the desired diagnostic tool. After enough fast data has been collected, the block 98 of FIG. 4 executes or otherwise implements the further diagnostic tool using the collected data so as to perform high level processing and loop analysis.

One further operation that may be performed by the diagnostic tool 52 is to compute the economic effect of using advanced control, such as using multi-variable control blocks or loops over standard control, such as single-input/single-output control blocks or loops. While the variability, performance, optimality, constraints and utilization indexes described above may be used to perform diagnostics and evaluation, in that these variables indicate the state of a process and show the areas of improvement within a process to technical personnel, it is more important for management personnel to have current insight into plant economic performance. In particular advanced control applications are justified primary by economic return and, therefore, a current measure of this return may be useful or extremely important in making decisions to upgrade process control to use advanced control routines or procedures.

Some of the information that may be useful in determining economic performance includes yield and throughput increase and profit results from increased yield and throughput.

To calculate these values, a user may associate the expected benefit in yield and throughput increase with one or more process variables and enter a coefficient or expression which relates the benefit with process variable. After the user has entered these values, the diagnostic system can apply formulas below to calculate production benefits:

$$\text{Yield Improvement} = Y\left(1 - \frac{S_{APC}}{S_{TOT}}\right)(X_L - \overline{X}_{old}) \qquad (12)$$

$$\text{Throughput Improvement} = T\left(1 - \frac{S_{APC}}{S_{TOT}}\right)(X_L - \overline{X}_{old}) \qquad (13)$$

Wherein:
  Y=a coefficient or expression which relates a specific process variable (PV) with yield improvement;
  T=is a coefficient or expression which relates a specific PV with throughout improvement;
  $S_{APC}$=PV standard deviation with the advanced control procedure such as a multi-variable control procedure;
  $S_{TOT}$=PV standard deviation with previous control procedure;
  $X_L$=PV limit value; and
  $X_{OLD}$=PV average value with previous control.
All these parameters, except Y and T can be made available to the diagnostic tool 52 by processing the existing function block parameters as described above.

Of course, the calculations of dollar values resulting from yield and throughput improvement requires the user to enter a function relating dollar values with a unit rise in yield or throughput improvement. Also, improvements in quality and energy savings from the use of new types of advanced control procedures could be calculated in a similar manner.

While the diagnostic tool 52 has been described as being used in conjunction with Fieldbus and standard 4–20 ma devices, it can be implemented using any other external process control communication protocol and may be used with any other types of function blocks or devices having function blocks therein. Moreover, it is noted that the use of the expression "function block" herein is not limited to what the Fieldbus protocol or the DeltaV controller protocol identifies as a function block but, instead, includes any other type of block, program, hardware, firmware, etc., associated with any type of control system and/or communication protocol that can be used to implement some process control function. While function blocks typically take the form of objects within an object oriented programming environment, this need not be case.

Although the diagnostic tool 52 described herein is preferably implemented in software, it may be implemented in hardware, firmware, etc., and may be implemented by any other processor associated with the process control system 10. Thus, the routine 60 described herein may be implemented in a standard multi-purpose CPU or on specifically designed hardware or firmware as desired. When implemented in software, the software routine may be stored in any computer readable memory such as on a magnetic disk, a laser disk, or other storage medium, in a RAM or ROM of a computer or processor, etc. Likewise, this software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A diagnostic tool for use in a process control system having a multiplicity of function blocks wherein one of the multiplicity of function blocks is a multi-variable function block, the diagnostic tool comprising:
    a data collection unit configured to communicate with each of the multiplicity of function blocks including the multi-variable function block to receive, on a regular basis during operation of the process control system, data pertaining to a function block operating parameter for each of the multiplicity of function blocks;
    a data analyzer that determines a value for the function block operating parameter for each of a number of times during operation of the process control system based on the received function block operating parameter data;
    a detector that detects a problem within the process control system based on the determined values of the function block operating parameter; and
    an output generator that creates a report indicating the detected problem.

2. The diagnostic tool of claim 1, wherein the function block operating parameter is a variability parameter and wherein the data analyzer determines a variability value associated with the multi-variable function block at each of the number of times based on the collected function block operating parameter data.

3. The diagnostic tool of claim 2, wherein the multi-variable function block has multiple inputs and wherein the data analyzer determines an initial variability index associated with each of the multiple inputs and computes a final variability index as the variability value based on the initial variability indices.

4. The diagnostic tool of claim 3, wherein the detector compares the variability value with a variability limit to detect the problem.

5. The diagnostic tool of claim 3, wherein the function block operating parameter data received from each of the function blocks includes a first variability indication indicative of an actual total standard deviation of a function block parameter and a second variability indication indicative of a capability standard deviation associated with the function block parameter.

6. The diagnostic tool of claim 5, wherein the data analyzer combines the first variability indication with the second variability indication to produce one of the initial variability indices.

7. The diagnostic tool of claim 1, wherein the function block operating parameter is a mode parameter and wherein the data collection unit receives a mode indication from the multi-variable function block.

8. The diagnostic tool of claim 1, wherein the function block operating parameter is a mode parameter, wherein the multi-variable function block has multiple inputs or outputs and wherein the data collection unit receives a mode indication for each of the inputs or outputs of the multi-variable function block.

9. The diagnostic tool of claim 8, wherein the data analyzer determines a final mode value for the multi-variable function block specifying if any one of mode indications is a non-normal mode.

10. The diagnostic tool of claim 1, wherein the function block operating parameter is a status parameter, wherein the multi-variable function block has multiple inputs and wherein the data collection unit receives status indications for each of the inputs or outputs of the multi-variable function block.

11. The diagnostic tool of claim 10, wherein the data analyzer determines a final status value from the status indications indicating if any one of the status indications is a non-normal status.

12. The diagnostic tool of claim 1, wherein the function block operating parameter is limit parameter, wherein the multi-variable function block has multiple inputs or outputs and wherein the data collection unit collects limit indications associated with the inputs or outputs of the multi-variable function block.

13. The diagnostic tool of claim 12, wherein the data analyzer determines a final limit value from the limit indications indicating if any one of the inputs or outputs of the multi-variable function block is at a limit.

14. The diagnostic tool of claim 1, wherein the data collection unit further collects an application state parameter from the multi-variable function block and wherein the detector ignores the function block operating parameter data associated with the multi-variable function block to detect the problem when the multi-variable function block operating parameter data is associated with a time in which the application state parameter was in a first state and the detector uses the function block operating parameter data associated with the multi-variable function block to detect the problem when the function block operating parameter data is associated with a time in which the application state parameter was in a second state.

15. A diagnostic tool for use in a process control system that includes a processor and that uses a multiplicity of function blocks including at least one multi-variable function block to control a process, the diagnostic tool comprising:
    a computer readable memory; and
    a routine stored on the computer readable memory and adapted to be implemented on the processor, wherein the routine;
        collects data pertaining to a function block operating parameter for each of the multiplicity of function blocks including the multi-variable function block on a regular basis during operation of the process;
        determines a value for the function block operating parameter for each of a number of times during the operation of the process control system based on the collected function block operating parameter data;
        detects a problem within the process control system based on the determined values of the function block operating parameter; and
        produces a report that lists the detected problem.

16. The diagnostic tool of claim 15, wherein the function block operating parameter is a variability parameter, wherein the multi-variable function block has multiple inputs and wherein the routine collects variability indications for each of the multiple inputs of the multi-variable function block.

17. The diagnostic tool of claim 16, wherein the routine determines a variability value for the multi-variable function block from the variability indications collected from the multi-variable function blocks and compares the variability value to a variability limit to detect the problem.

18. The diagnostic tool of claim 15, wherein the function block operating parameter is a mode parameter, wherein the multi-variable function block has multiple inputs or outputs and wherein the routine collects mode indications for each of the multiplicity of inputs or outputs of the multi-variable function block.

19. The diagnostic tool of claim 15, wherein the function block operating parameter is a status parameter, wherein the multi-variable function block has multiple inputs or outputs and wherein the routine collects status indications for each of the multiplicity of inputs or outputs of the multi-variable function block.

20. The diagnostic tool of claim 15, wherein the function block operating parameter is limit parameter, wherein the multi-variable function block has multiple inputs or outputs and wherein the routine collects limit indications associated with each of the inputs or outputs of the multi-variable function block.

* * * * *

UNITED STATES PATENT AND TRADEMARK OFFICE
CERTIFICATE OF CORRECTION

PATENT NO. : 6,615,090 B1
DATED : September 2, 2003
INVENTOR(S) : Mark J. Nixon et al.

It is certified that error appears in the above-identified patent and that said Letters Patent is hereby corrected as shown below:

Title page,
Item [73], Assignee, please delete "Fisher-Rosemont Systems, Inc." and insert
-- Fisher-Rosemount Systems, Inc. --
Item [56], References Cited, U.S. PATENT DOCUMENTS, please delete "S"nchez" from the U.S. Patent No. 4,358,822 A and replace with -- Sánchez --.
Please delete "Hö lter et al." from the U.S. Patent No. 4,992,965 A and replace with -- Hölter et al. --.
FOREIGN PATENT DOCUMENTS, please delete "6/1993" from the Great Britain Patent No.928704 and replace with -- 6/1963 --.
OTHER PUBLICATIONS, please delete the second occurrence of "de Groot et al.". and please delete "Eryürek" in four occurrences and replace with -- Eryürek --.

Column 2,
Line 3, please delete "Fieldbus," and replace with -- Fieldbus --.
Line 4, please delete "including," and replace with -- including --.

Column 3,
Line 33, please delete "calibration-features" and replace with -- calibration features --.

Column 4,
Line 24, please delete "to, correct" and replace with -- to correct --.

Column 5,
Line 28, please delete "desired," and replace with -- desired --.
Line 47, please delete "loop," and replace with -- loop --.
Line 50, please delete "devices," and replace with -- devices --.

Column 8,
Line 40, please delete "firm ware" and replace with -- firmware --.
Line 54, please delete "more-outputs," and replace with -- more outputs, --.

Column 9,
Line 9, please delete "tool," and replace with -- tool --.
Line 44, please delete "and or" and replace with -- and/or --.

Column 12,
Line 27, please delete "N-executions" and replace with -- N executions --.

Column 13,
Line 25, please delete "DOS" and replace -- OOS --.

UNITED STATES PATENT AND TRADEMARK OFFICE
CERTIFICATE OF CORRECTION

PATENT NO. : 6,615,090 B1
DATED : September 2, 2003
INVENTOR(S) : Mark J. Nixon et al.

It is certified that error appears in the above-identified patent and that said Letters Patent is hereby corrected as shown below:

Column 17,
Line 10, please replace "52," and replace with -- 52 --.

Column 18,
Line 31, please delete "such an in a memory" and insert -- such as in a memory --.

Column 20,
Line 59, please delete "will illustrated" and insert -- will be illustrated --.

Column 24,
Line 35, please delete "$X_{OLD}$" from the equation and insert -- $X_{OLD}$ --.
Line 59, please delete "not be case" and insert -- not be the case --.

Signed and Sealed this

Seventeenth Day of August, 2004

JON W. DUDAS
*Acting Director of the United States Patent and Trademark Office*